(12) United States Patent
Zhang

(10) Patent No.: US 9,389,880 B2
(45) Date of Patent: Jul. 12, 2016

(54) METHOD, SERVER, MOBILE TERMINAL AND SYSTEM FOR PROGRAM EXECUTION

(71) Applicant: Huawei Device Co., Ltd., Shenzhen (CN)

(72) Inventor: Yan Zhang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/553,503

(22) Filed: Nov. 25, 2014

(65) Prior Publication Data
US 2015/0079964 A1 Mar. 19, 2015

Related U.S. Application Data

(63) Continuation of application No. PCT/CN2013/075725, filed on May 16, 2013.

(30) Foreign Application Priority Data

May 25, 2012 (CN) .......................... 2012 1 0166709

(51) Int. Cl.
*G06F 9/44* (2006.01)
*G06F 3/0481* (2013.01)
*H04M 1/725* (2006.01)

(52) U.S. Cl.
CPC .......... *G06F 9/4443* (2013.01); *G06F 3/04812* (2013.01); *H04M 1/72519* (2013.01); *H04M 1/72563* (2013.01); *H04M 1/72586* (2013.01); *H04M 1/72569* (2013.01)

(58) Field of Classification Search
CPC ......... H04W 4/003; H04W 4/16; H04W 4/26; H04W 92/00; G06F 3/00; G06F 3/01; G06F 3/016; G06F 3/048; G06F 3/0481; G06F 3/04812; G06F 3/04817; G06F 3/04842; G06F 8/34
See application file for complete search history.

(56) References Cited

U.S. PATENT DOCUMENTS 6,912,386 B1 6/2005 Himberg et al.
7,386,279 B2 * 6/2008 Wagner ............... G06F 3/04817
455/556.2
(Continued)

FOREIGN PATENT DOCUMENTS

CN 1497434 A 5/2004
CN 1611082 A 4/2005
(Continued)

OTHER PUBLICATIONS

Foreign Communication From a Counterpart Application, European Application No. 13793458.4, Extended European Search Report dated Jun. 24, 2015, 7 pages.
(Continued)

*Primary Examiner* — San Htun
(74) *Attorney, Agent, or Firm* — Conley Rose, P.C.; Grant Rodolph

(57) ABSTRACT

A program execution method, a server, a mobile terminal, and a system. The method includes: receiving a user action UA record sent by a mobile terminal; searching the UA record for a UA sequence that repeatedly appears; determining an association relationship between UAs in the UA sequence that repeatedly appears; creating a corresponding use mode according to the association relationship; and sending the use mode to the mobile terminal, so that the mobile terminal uses a use mode corresponding to a monitored UA, wherein the user action refers to an operation performed on an application program on the mobile terminal. In addition, a corresponding server, a mobile terminal, and a program execution system are provided. The present invention meets a personalized requirement of a user, and moreover reduces complexity of a user operation, saves the user's time and energy, and improves user experience.

15 Claims, 9 Drawing Sheets

Icon Layout before Vber is tapped

Icon Layout after Vber is tapped

(56) References Cited

U.S. PATENT DOCUMENTS

| | | | |
|---|---|---|---|
| 7,487,467 | B1* | 2/2009 | Kawahara ............ G06F 3/04817 715/762 |
| 8,271,889 | B1* | 9/2012 | Beckert ................. H04W 4/001 370/342 |
| 2004/0070591 | A1 | 4/2004 | Kato |
| 2005/0213511 | A1* | 9/2005 | Reece, Jr. .............. H04W 24/00 370/252 |
| 2006/0095916 | A1 | 5/2006 | Nishida |
| 2006/0141990 | A1 | 6/2006 | Zak et al. |
| 2006/0247915 | A1 | 11/2006 | Bradford et al. |
| 2006/0271883 | A1* | 11/2006 | Bier .................. G06F 17/30873 715/853 |
| 2010/0318928 | A1* | 12/2010 | Neuman ............... G06F 3/0482 715/769 |
| 2011/0009103 | A1* | 1/2011 | Do ........................ G06F 3/0482 455/414.3 |
| 2011/0072492 | A1* | 3/2011 | Mohler ............... G06F 3/04817 726/3 |
| 2011/0154262 | A1 | 6/2011 | Lai et al. |
| 2011/0191611 | A1* | 8/2011 | boni ang gaw go ..... G06F 3/048 713/320 |
| 2012/0023226 | A1* | 1/2012 | Petersen ............... H04W 4/028 709/224 |

FOREIGN PATENT DOCUMENTS

| | | |
|---|---|---|
| CN | 102104666 A | 6/2011 |
| CN | 102147732 A | 8/2011 |
| CN | 102722410 A | 10/2012 |
| EP | 1408674 A2 | 4/2004 |
| JP | 2007004273 A | 1/2007 |

OTHER PUBLICATIONS

Partial English Translation and Abstract of Chinese Patent Application No. CN102722410A, Dec. 27, 2014, 3 pages.

Partial English Translation and Abstract of Chinese Patent Application No. CN102147732A, Dec. 10, 2014, 22 pages.

Foreign Communication From a Counterpart Application, PCT Application No. PCT/CN2013/075725, English Translation of International Search Report dated Aug. 29, 2013, 2 pages.

Foreign Communication From a Counterpart Application, PCT Application No. PCT/CN2013/075725, English Translation of Written Opinion dated Aug. 29, 2013, 16 pages.

Foreign Communication From a Counterpart Application, Chinese Application No. 201210166709.X, Chinese Office Action dated Oct. 17, 2013, 8 pages.

* cited by examiner

TS*CA*TRUYCBAUPQ*CA*SZWA*CA*ERNMAB*CA*UJK*CA*ITR*CA*CFGHP

METHOD, SERVER, MOBILE TERMINAL AND SYSTEM FOR PROGRAM EXECUTION

CROSS-REFERENCE

This application is a continuation of International Application No. PCT/CN2013/075725, filed on May 16, 2013, which claims priority to Chinese Patent Application No. 201210166709.X, filed on May 25, 2012, both of which are hereby incorporated by reference in their entireties.

TECHNICAL FIELD

The present invention relates to the communications field, and in particular, to a method, a server, a mobile terminal, and a system for program execution.

BACKGROUND

In daily use of a mobile terminal, a user is usually accustomed to running another one or more application programs after running an application program, which forms a use habit of the user. Different users have different use habits. These habitual trivial operations repeated by the users every day may cause a waste of the users' time and energy.

SUMMARY

The present invention provides a program execution method, a server, a mobile terminal, and a system, so as to simplify operations of a user on a mobile terminal and save the user's time and energy.

According to one aspect, a program execution method is provided, including: receiving a user action (UA) record sent by a mobile terminal; searching the UA record for a UA sequence that repeatedly appears; determining an association relationship between UAs in the UA sequence that repeatedly appears; creating a corresponding use mode according to the association relationship; and sending the use mode to the mobile terminal, so that the mobile terminal uses a use mode corresponding to a monitored UA, wherein the user action refers to an operation performed on an application program on the mobile terminal.

According to another aspect, a program execution method is further provided, including: sending, by a mobile terminal, a user action UA record to a server; receiving, by the mobile terminal, a use mode returned by the server; and when the mobile terminal monitors a UA, determining whether the UA meets a trigger condition of at least one use mode of the use modes, and if yes, using the at least one use mode whose trigger condition is met on the mobile terminal, wherein the user action refers to an operation performed on an application program on the mobile terminal, and the use mode is created by the server according to an association relationship after the server searches the UA record for a UA sequence that repeatedly appears and determines the association relationship between UAs in the UA sequence.

According to still another aspect, a program execution method is further provided, including: acquiring a user action UA record; searching the UA record for a UA sequence that repeatedly appears, and determining an association relationship between UAs in the UA sequence; creating a corresponding use mode according to the association relationship; and when a mobile terminal monitors a UA, determining whether the UA meets a trigger condition of at least one use mode of the use modes, and if yes, using the at least one use mode whose trigger condition is met on the mobile terminal, wherein the user action refers to an operation performed on an application program on the mobile terminal.

According to yet another aspect, a server is further provided, including: a receiving module configured to receive a UA record sent by a mobile terminal; a searching module configured to search the UA record received by the receiving module for a UA sequence that repeatedly appears; an associating module configured to determine an association relationship between UAs in the UA sequence that repeatedly appears; a creating module configured to create a corresponding use mode according to the association relationship determined by the associating module; and a sending module configured to send the use mode to the mobile terminal, so that the mobile terminal uses a use mode corresponding to a monitored UA, wherein the user action refers to an operation performed on an application program on the mobile terminal.

According to another aspect, a mobile terminal is further provided, including: a sending module configured to send a user action UA record to a server; a receiving module configured to receive a use mode returned by the server; a determining module configured to: when the mobile terminal monitors a UA, determine whether the UA meets a trigger condition of at least one use mode of the use modes; and a using module configured to: if the determining module determines that the UA meets the trigger condition of the at least one use mode of the use modes, use the at least one use mode whose trigger condition is met on the mobile terminal, wherein the user action refers to an operation performed on an application program on the mobile terminal, and the use mode is created by the server according to an association relationship after the server searches the UA record for a UA sequence that repeatedly appears and determines the association relationship between UAs in the UA sequence.

According to still another aspect, a mobile terminal is further provided, including: an acquiring module configured to acquire a user action UA record; an associating module configured to search the UA record for a UA sequence that repeatedly appears, and determine an association relationship between UAs in the UA sequence; a creating module configured to create a corresponding use mode according to the association relationship; a determining module configured to: when a UA is monitored, determine whether the UA meets a trigger condition of at least one use mode of the use modes; and a using module configured to: if the determining module determines that the UA meets the trigger condition of the at least one use mode of the use modes, use the at least one use mode whose trigger condition is met on the mobile terminal, wherein the user action refers to an operation performed on an application program on the mobile terminal.

According to yet another aspect, a program execution system is further provided, where the system includes the foregoing server and the foregoing mobile terminal.

The technical solutions provided by embodiments of the present invention have the following beneficial effects:

A UA record sent by a mobile terminal is searched for a UA sequence that repeatedly appears, and a corresponding use mode is created according to an association relationship between UAs in the UA sequence and is sent to the mobile terminal, thereby implementing that the mobile terminal uses a corresponding use mode according to a monitored UA. The use mode is created based on UAs, and therefore can reflect a use habit of a user, adequately meet the user's personalized requirements, and greatly improve user experience. In addition, the use mode corresponding to the monitored UA can be used according to the monitored UA, so that an application program that corresponds to one or more UAs associated with the UA can be executed, and the user does not need to find, one by one, and execute, one by one, the application programs corresponding to the UAs, which greatly reduces complexity of a user operation, saves the user's time and energy, and improves the user experience.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Embodiment 1

Figure 1:
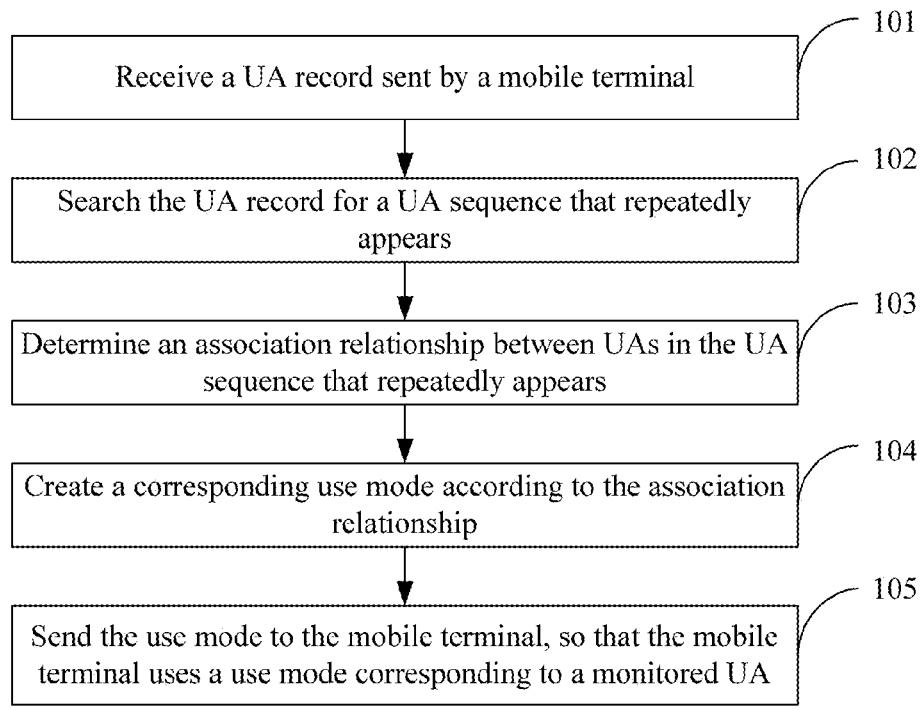
FIG. 1 is a flowchart of a program execution method according to Embodiment 1 of the present invention.

Referring to FIG. 1, the embodiment provides a program execution method, and a process of the method is specifically as follows:

101: Receive a User Action (UA) record sent by a mobile terminal.

102: Search the UA record for a UA sequence that repeatedly appears.

Each UA sequence includes at least two UAs.

103: Determine an association relationship between UAs in the UA sequence that repeatedly appears.

104: Create a corresponding use mode according to the association relationship.

The use mode may refer to various parameter configurations related to an application program on the mobile terminal. These parameter configurations reflect a use habit and the like of a user on the mobile terminal, and include but are not limited to: a UA that triggers the association relationship and a UA associated with the UA, or a UA that triggers the association relationship, a UA associated with the UA, and a user environment (UE) and/or a mapping function of the UE of a UA in the association relationship.

105: Send the use mode to the mobile terminal, so that the mobile terminal uses a use mode corresponding to a monitored UA.

The user action refers to an operation performed on an application program on the mobile terminal.

In the embodiment, the UA sequence that repeatedly appears may include multiple cases, and the following description uses an example in which a letter represents a UA. For example, if a UA record is ABCDEABCFGABCHJAB-CKL, the UA sequence that repeatedly appears may include: AB, ABC, and BC; for another example, if a UA record is AABBMNKFAABBWEIFHAABBZIXDGN, the UA sequence that repeatedly appears may include: AA, AAB, AABB, AB, ABB, and BB; certainly, there may further be many other cases, and the present invention is not limited thereto.

Specifically, the searching the UA record for a UA sequence that repeatedly appears may include searching the UA record for a UA sequence that appears at a frequency higher than a preset threshold.

Further, the searching the UA record for a UA sequence that appears at a frequency higher than a preset threshold may include searching the UA record for a UA sequence of which a quantity of appearance times within preset time is higher than a preset threshold.

In the embodiment, the determining an association relationship between UAs in the UA sequence that repeatedly appears may include: for any UA sequence that repeatedly appears N times within preset time, grouping the N UA sequences to form a UA sequence set, where N≥2; acquiring some UA sequences from the UA sequence set, using all UAs in the some UA sequences to form a first UA sequence set, and generating, according to a first UE of the UAs in the first UA sequence set, a mapping function of the UE of the UA sequence; acquiring all UAs in a remaining UA sequence except the some UA sequences from the UA sequence set to form a second UA sequence set, verifying the mapping function according to a second UE of the UAs in the second UA sequence set, and determining, according to a result of the verifying, whether the mapping function meets a specified requirement; and if the mapping function meets the specified requirement, determining that the UAs in the UA sequence are in a causal association relationship; and if the mapping function does not meet the specified requirement, determining that the UAs in the UA sequence are in an aggregate association relationship.

The mapping function of the UE is obtained after function fitting is performed by using an initial value of the UE as an independent variable and using a changed value of the UE as a function value, where the initial value of the UE refers to a value of the UE before a UA occurs, and the changed value of the UE refers to a value of the UE after a UA occurs. When the function fitting is performed, a used UE generally may be a UE of an internal environment of the mobile terminal, for example, volume, screen brightness, and the like, the initial value of the UE may serve as the independent variable of the mapping function, and the changed value of the UE may serve as a dependent variable of the mapping function. Certainly, there is another application scenario in which the function fitting may be performed by combining both the UE of the internal environment and a UE of an external environment of the mobile terminal. In this case, because the external environment of the mobile terminal generally does not change before and after occurrence of a UA, only an initial value of the UE of the external environment needs to be considered, and there is no need to consider a changed value of UE of the external environment. Specifically, it may be that an initial value of an internal environment UA is used as the independent variable of the mapping function, a changed value of the UE of the internal environment is used as the dependent variable of the mapping function, and the initial value of the UE of the external environment is used as a condition for adjusting the UE of the internal environment. Then, an obtained function is a function for adjusting the UE of the internal environment of the mobile terminal in a case in which the UE of the external environment meets the condition. Certainly, it may be that a UE includes two independent variables: a value of the UE of the external environment (for example, volume or light of an external environment) of the mobile terminal and the initial value of the UE (for example, volume or screen brightness of the mobile terminal) of the internal environment of the mobile terminal, and the dependent variable may be the changed value of the UE of the internal environment of the mobile terminal, so that accustomed settings of the user under different environments can be fitted according to an environment (an external environment and an internal environment) in which the mobile terminal is located and be provided for the user to select for execution and/or setting. Because a use habit of each user is obtained by means of statistics according to a habit of each user, different habits of different users can be met, and the user experience is improved.

Further, the verifying the mapping function according to a second UE of the UAs in the second UA sequence set, and determining, according to a result of the verifying, whether the mapping function meets a specified requirement may include: acquiring the second UE of the UAs in the second UA sequence set; using an initial value of the second UE as an independent variable, calculating a function value of the second UE by using the mapping function, and calculating an average deviation rate of the mapping function according to the function value of the second UE and a changed value of the second UE; and determining whether the average deviation rate of the mapping function is less than a preset deviation rate threshold; and if yes, determining that the mapping function meets the specified requirement, and otherwise, determining that the mapping function does not meet the specified requirement.

Further in the embodiment, the creating a corresponding use mode according to the association relationship may include: if the association relationship is the causal association relationship, generating a causal use mode corresponding to the causal association relationship, where the causal use mode includes: a first list of UAs that trigger the causal association relationship, a second list of UAs causally associated with the UAs that trigger the causal association relationship, and a mapping function of a UE of a UA in the causal association relationship; and if the association relationship is an aggregate association relationship, generating an aggregate use mode corresponding to the aggregate association relationship, where the aggregate use mode includes: a third list of UAs that trigger the aggregate association relationship, and a fourth list of UAs aggregately associated with the UAs that trigger the aggregate association relationship, or includes: a third list of UAs that trigger the aggregate association relationship, a fourth list of UAs aggregately associated with the UAs that trigger aggregate association relationship, and a UE of a UA in the aggregate association relationship.

The embodiment further includes: selecting, by the mobile terminal, a use mode corresponding to a monitored UA from the use modes and performing a setting, which may include: selecting, by the mobile terminal, the use mode corresponding to the monitored UA from the use modes; and prompting the user with the corresponding use mode, so that the user selects at least part of the use mode to be executed and/or set on the mobile terminal.

In the embodiment, the UA record may specifically be a record of a UA that occurs on the mobile terminal within a preset period.

In the embodiment, the UE may refer to an environment in which the mobile terminal is located during occurrence, before occurrence, or after occurrence of a UA, and include one or more of the following: time, location, temperature, light, volume of an external environment, volume of the mobile terminal, gravity, and screen brightness.

The foregoing program execution method may be executed by a server, where the server is a device on a network side and may be an independent device, or may be multiple devices, for example, a server on a cloud, and the present invention is not limited thereto.

According to the foregoing method provided in the embodiment, a UA record sent by a mobile terminal is searched for a UA sequence that repeatedly appears, and a corresponding use mode is created according to an association relationship between UAs in the UA sequence that repeatedly appears and is sent to the mobile terminal, thereby implementing that the mobile terminal uses a corresponding use mode according to a monitored UA. The use mode is created based on UAs, and therefore can reflect a use habit of a user, adequately meet the user's personalized requirements, and greatly improve user experience. In addition, the use mode corresponding to the monitored UA can be used according to the monitored UA, so that an application program that corresponds to one or more UAs associated with the UA can be executed, and the user does not need to find, one by one, and execute, one by one, the application programs corresponding to the UAs, which greatly reduces complexity of a user operation, saves the user's time and energy, and improves the user experience.

Embodiment 2

Figure 2:
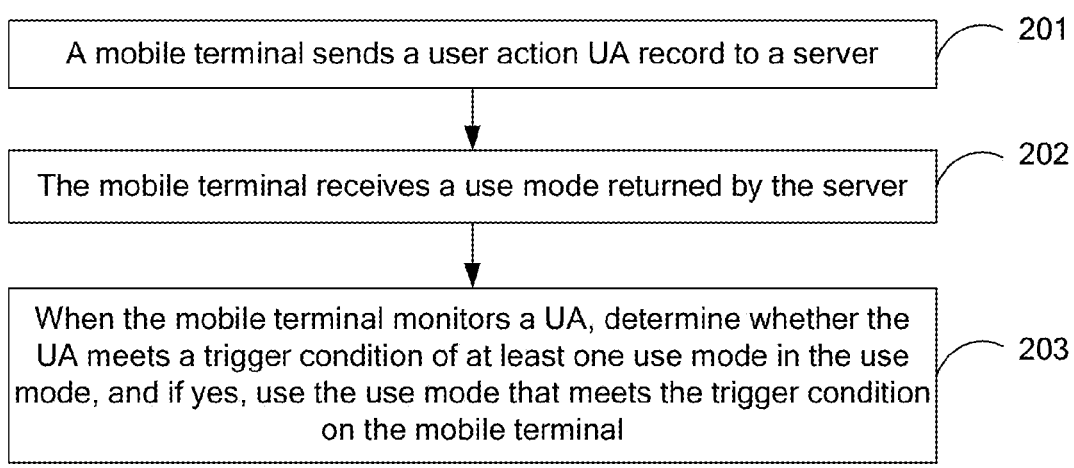
FIG. 2 is a flowchart of a program execution method according to Embodiment 2 of the present invention.

Referring to FIG. 2, the embodiment further provides a program execution method, including:

201: A mobile terminal sends a user action UA record to a server.

202: The mobile terminal receives a use mode returned by the server.

203: When the mobile terminal monitors a UA, determine whether the UA meets a trigger condition of at least one use mode of the use modes, and if yes, use the at least one use mode whose trigger condition is met on the mobile terminal.

The user action refers to an operation performed on an application program on the mobile terminal, and the use mode is created by the server according to an association relationship after the server searches the UA record for a UA sequence that repeatedly appears and determines the association relationship between UAs in the UA sequence.

Specifically, the sending, by a mobile terminal, a user action UA record to a server may include: recording a UA that occurs on the mobile terminal within a preset period to obtain the UA record; and sending the UA record within the preset period to the server.

Further, before a mobile terminal sends a user action UA record to a server, the method may further include: when a UA occurs on the mobile terminal for the first time, recording the UA that occurs for the first time, and a UE of the UA; and when the UA occurs on the mobile terminal not for the first time, finding, among one or more UEs of the UA of this time, a UE that is different from any one of one or more UEs of a UA of last time, and recording the UA of this time and the found UE.

Further, the determining, when the mobile terminal monitors a UA, whether the UA meets a trigger condition of at least one use mode of the use modes may include: determining whether at least one first use mode exists in the use modes, where a list of UAs that are included in the first use mode and trigger an association relationship includes the monitored UA, or a list of UAs that are included in the first use mode and trigger an association relationship includes the monitored UA, and a UE of the UA that triggers the association relationship conforms to a UE specified in a mapping function that is included in the first use mode; and if yes, determining that the UA meets the trigger condition of the at least one use mode of the use modes; and otherwise, determining that the UA does not meet the trigger condition of the at least one use mode of the use modes.

In the embodiment, the using the at least one use mode whose trigger condition is met on the mobile terminal may include acquiring a list of UAs that are associated with the UA and included in the at least one use mode whose trigger condition is met, and executing or setting at least some of the UAs in the list of UEs on the mobile terminal.

In the embodiment, the using the at least one use mode whose trigger condition is met on the mobile terminal may further include: acquiring a UE of at least some of UAs that are in the association relationship and included in the at least one use mode whose trigger condition is met, and setting a UE of the mobile terminal according to the UE that is acquired; or acquiring a mapping function of a UE of at least some of UAs that are in the association relationship and included in the at least one use mode whose trigger condition is met, acquiring a current UE of the mobile terminal, calculating a function value of the current UE by using the mapping function, and setting a UE of the mobile terminal according to the function value of the current UE.

In the embodiment, the using the at least one use mode whose trigger condition is met on the mobile terminal may include: if the at least one use mode whose trigger condition is met is a causal use mode, acquiring a second list of UAs causally associated with the UA and included in the causal use mode, and a mapping function of a UE of a UA in the association relationship, acquiring a current UE of the mobile terminal, calculating the function value of the current UE by using the mapping function, executing at least some of the UAs in the second list of UAs on the mobile terminal, and setting a UE of the mobile terminal according to the function value of the current UE; and if the at least one use mode whose trigger condition is met is an aggregate use mode, acquiring a fourth list of UAs aggregately associated with the UA and included in the aggregate use mode, and executing at least some of the UAs in the fourth list of UAs on the mobile terminal; or acquiring a fourth list of UAs aggregately associated with the UA and included in the aggregate use mode, and a UE of a UA in the association relationship, executing at least some of the UAs in the fourth list of UAs on the mobile terminal, and setting a UE of the mobile terminal according to the UE that is acquired.

In the embodiment, the using the at least one use mode whose trigger condition is met on the mobile terminal may further include: prompting, by the mobile terminal, a user with the at least one use mode whose trigger condition is met, so that the user selects at least part of the use mode to be executed and/or set on the mobile terminal.

The foregoing mobile terminal includes but is not limited to a Personal Computer (PC), a mobile phone, a tablet computer, a Personal Digital Assistant (PDA), and the like, and the present invention is not limited thereto.

According to the foregoing method provided in the embodiment, use modes returned by a server are received, when a mobile terminal monitors a UA, it is determined whether the UA meets a trigger condition of at least one use mode of the use modes, and if yes, the at least one use mode whose trigger condition is met is used on the mobile terminal, thereby implementing that the mobile terminal uses a corresponding use mode according to a monitored UA. The use mode is created based on UAs, and therefore can reflect a use habit of a user, adequately meet the user's personalized requirements, and greatly improve user experience. In addition, the use mode corresponding to the monitored UA can be used according to the monitored UA, so that an application program that corresponds to one or more UAs associated with the UA can be executed, and the user does not need to find, one by one, and execute, one by one, the application programs corresponding to the UAs, which greatly reduces complexity of a user operation, saves the user's time and energy, and improves the user experience.

Embodiment 3

Figure 3:
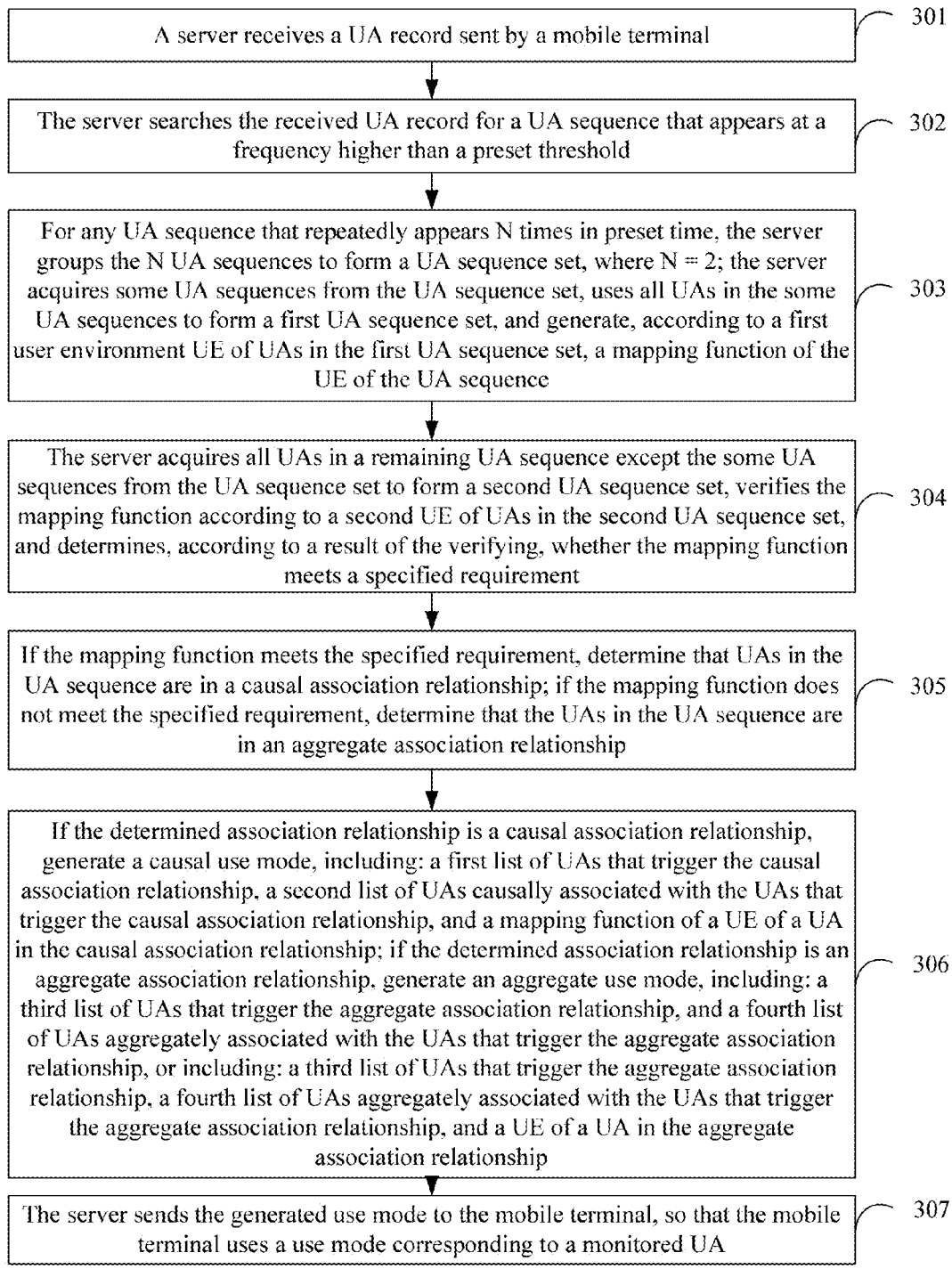
FIG. 3 is a flowchart of a program execution method according to Embodiment 3 of the present invention.

Referring to FIG. 3, the embodiment provides a program execution method, the method is based on a server device, and a process is specifically as follows:

301: A server receives a UA record sent by a mobile terminal.

A UA involved in the embodiment of the present invention refers to an operation performed on an application program on the mobile terminal. The operation includes but is not limited to: starting an application program, exiting an application program, and the like. The UA record is specifically a record of a UA that occurs on the mobile terminal within a preset period, records information about the UA, and may include but is not limited to: an identifier of the UA, a UE corresponding to the UA, and the like. The identifier of the UA may be an identifier of an application program corresponding to the UA, and the identifier of the application program may be expressed by using an identifier of a process corresponding to the application program. Generally, multiple application programs are installed on a mobile terminal, each application program has a corresponding process, and an application program can be identified by using an Identity (ID) of a process. Therefore, in the embodiment of the present invention, a process ID can be used to identify a UA. The UE refers to an environment in which the mobile terminal is located during occurrence, before occurrence, or after occurrence of a UA, and may include one or more of the following: time, location, temperature, light, volume of an external environment, volume of the mobile terminal, gravity, and screen brightness.

For example, the UA record includes three UAs: A, B, and C, where A represents starting a browser, B represents sending an email, and C represents setting screen brightness. A UA is A, which may be expressed as A (a, b, c . . . ), including three parameters of a user environment: time a, light b, and environment volume c. This UA record indicates that when a browser is started, the time is a, the light is b, and the environment volume is c.

The embodiment imposes no specific limitation on a format of the UA record, and includes but is not limited to use of the following format:

$$\text{ID-TAG-V1[V2[V3 ... ]]};\qquad(1)$$

Each parameter in the format is described as follows:

ID: 16-bit data of an unsigned integer type, using a process ID of an application program to uniquely identify a UA;

TAG: 128-bit flag bit string, used to indicate whether a corresponding UE is valid, where a specific manner is not limited; for example, the number 1 may be used to indicate that the UE is valid, and the number 0 is used to indicate that the UE is invalid, where the quantity of determines the quantity of valid Vi, and i is an integer, which, for example, may be 1, 2, 3, 4 . . . ; and Vi: 32-bit data of an integer type or data of a floating point type, used to record a number value of each UE; generally, there are a maximum of 128 UEs in a mobile terminal, and certainly, more UEs may be added by adjusting a length of the TAG.

302: The server searches the received UA record for a UA sequence that appears at a frequency higher than a preset threshold.

Optionally, the mobile terminal may use the following manner to save the UA record: only information that is different from information of last time is recorded each time, and same information is no longer repeatedly recorded. After receiving the UA record, the server may perform saving in the same manner as the mobile terminal, or may perform the following processing: acquiring and saving all information of a first UA record; for a subsequent UA record, acquiring all information of the subsequent UA record and all information of a previous UA record, adding information that is included in the information of the previous UA record and is the same as the UA record to the UA record, and then saving the UA record. The present invention is not thereto. Only the information that is different from the information of last time is recorded, and the same information is no longer repeatedly recorded, so that data transmission efficiency can be improved and user traffic can be reduced.

Specifically, when the UA record received by the server uses the format shown in the foregoing expression (1), the server may read the TAG flag bit in the UA record. If the TAG flag bit indicates that the UE is valid, a UE recorded in a corresponding Vi is read according to 1 in the TAG flag bit. When multiple TAG flag bits indicate that the UEs are valid, each valid UE is read in sequence until all the UEs are read.

In the embodiment, the searching, by the server, the received UA record for a UA sequence that appears at a frequency higher than a preset threshold may include: searching the received UA record for a UA sequence of which a quantity of appearance times within preset time is higher than a preset threshold. The searching the received UA record for a UA sequence of which a quantity of appearance times within preset time is higher than a preset threshold may further specifically include: acquiring, by the server, a temporary UA sequence whose length is a specified length from the UA record; calculating a quantity of times the temporary UA sequence appears in the UA record; obtaining an appearance frequency of the temporary UA sequence by dividing the calculated quantity of times by the preset time; and acquiring a UA sequence that appears at a frequency higher than a preset threshold from the temporary UA sequence.

The specified length refers to a quantity of UAs included in a UA sequence, and the specified length is at least 2, that is, a UA sequence includes at least two UAs. Optionally, the foregoing steps may be repeatedly performed starting from the specified length of 2, and the specified length is progressively increased. If a UA sequence that repeatedly appears can be found in each cycle, searching continues until the specified length is greater than a preset length threshold. Alternatively, if a UA sequence of a currently specified length that repeatedly appears is not found in a cycle, the cycle is exited and searching is ended. For example, it is assumed that the preset length threshold is 100, the specified length starts from 2, and the foregoing steps are performed in a cycling manner. If a UA sequence of a currently specified length that repeatedly appears is found in a current cycle, it is determined whether the currently specified length is greater than 100. If the currently specified length is greater than 100, cycling is ended. If the currently specified length is not greater than 100, the specified length is increased by 1 and cycling continues. The cycling and a searching process are not ended until the currently specified length is greater than 100. By means of the foregoing process, a UA sequence that repeatedly appears and whose length is any value within [2, 100] can be found in the UA record.

The preset time may be a fixed value set by a user, for example, 15 days or 20 days, or the preset time may be time calculated according to the UA record, and includes but is not limited to a time span, and the like. The time span refers to: a difference between recording time of a first UA and recording time of a second UA in a set formed by all the temporary UA sequences that appear in the UA record, where the first UA is a UA whose recording time is the earliest in the set, and the second UA is a UA whose recording time is the latest in the set. For example, the temporary UA sequence is a CA, and all CAs in the UA record are grouped to form a set. If the earliest recording time of a CA in the set is 12:00 on May 1, 2012 and the latest recording time of a CA in the set is 12:00 on May 21, 2012, the calculated time span is 20 days. The time span may be a preset time period, or the like, and the embodiment is not limited thereto.

The preset threshold may be set according to a requirement. In an actual application, if the threshold is set too high, a possible association relationship may be missed, and if the threshold is set too low, validity of an association relationship may be decreased. Therefore, preferably, the threshold may be set to a number value within [0.62, 2.5] according to an actual condition.

In the embodiment, multiple algorithms may be used to implement the search, performed by the server, for a UA sequence that appears at a frequency higher than a preset threshold, and the present invention is not limited thereto. For example, a Frequently User Action Sequence (FUAS) algorithm may be used for implementation. A specific process is as follows:

(1) Save the UA record in an array of an unsigned integer type.

(2) Initialize a hash table, save all UA sequences whose lengths are Len in the UA record to the hash table, and calculate a quantity of appearance times N of each UA sequence in the hash table, where $2 \le \text{Len} \le 100$.

(3) Acquire preset time $\Delta t$ of each UA sequence in the hash table, and calculate an appearance frequency $N/\Delta t$ of the UA sequence. If $N/\Delta t \ge$ the threshold, write the UA sequence into a file, and record writing time.

(4) After increasing Len by 1, continue performing step (2) until Len=100.

In the file obtained after an operation of the foregoing FUAS algorithm, several UA sequences are saved, and the several UA sequences are considered as UA sequences that appear at a frequency higher than the preset threshold.

Figures 4, 5:
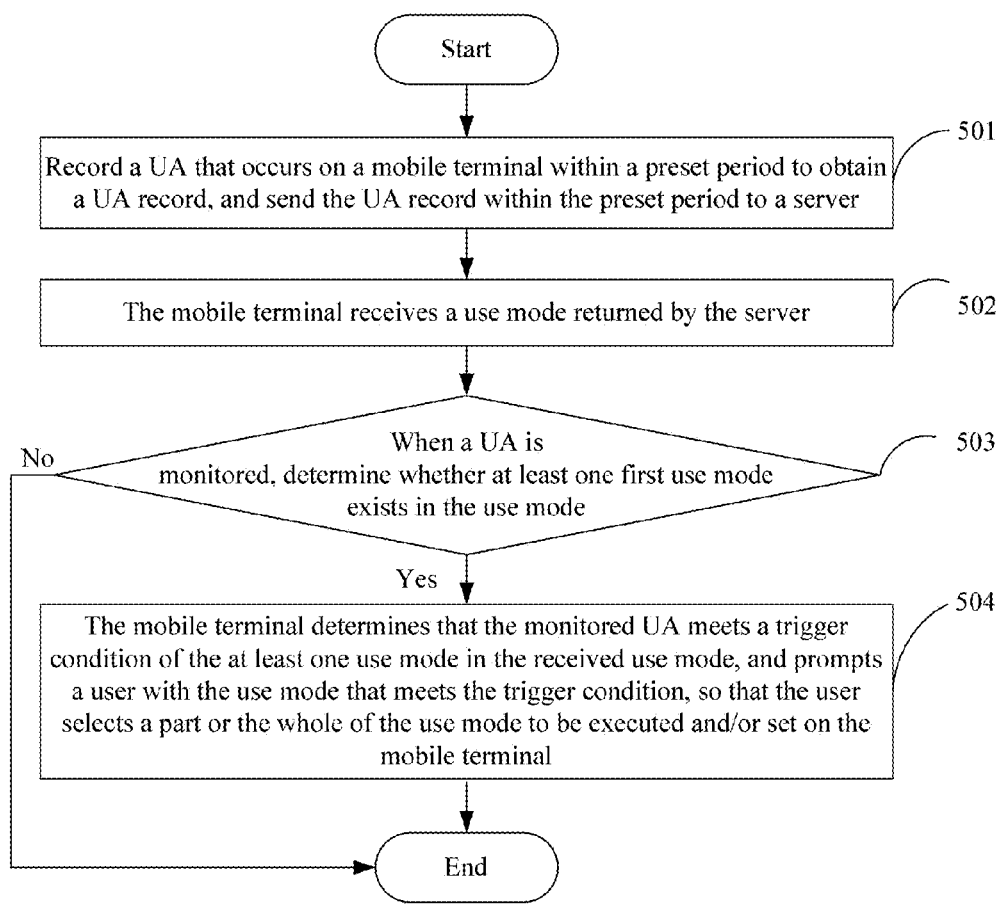
FIG. 4 is a schematic diagram of a UA record according to Embodiment 3 of the present invention.
FIG. 5 is a flowchart of a program execution method according to Embodiment 4 of the present invention.

Referring to FIG. 4, FIG. 4 is a schematic diagram of a UA record provided by the embodiment. For ease of description, a UE in the UA record is omitted, and it does not mean that each UA does not have a corresponding UE. After the server performs calculation according to the described FUAS algorithm, the UA sequence that appears at a frequency higher than the preset threshold can be obtained. For example, when the specified length is 2, UA sequences whose lengths are 2 are saved to the hash table, and a quantity of appearance times of each UA sequence in the hash table is calculated, where a UA sequence "CA" appears 6 times in total, which are higher than the preset threshold 2. Therefore, "CA" is written into the file, and writing time is recorded. The rest is deduced in the same manner. After the specified length reaches 100, the FUAS algorithm is ended.

303: For any UA sequence that repeatedly appears N times within preset time, the server groups the N UA sequences to form a UA sequence set, where N≥2; the server acquires some UA sequences from the UA sequence set, uses all UAs in the some UA sequences to form a first UA sequence set, and generates, according to a first user environment UE of the UAs in the first UA sequence set, a mapping function of the UE of the UA sequence.

In the embodiment, the server may acquire the some UA sequences from the UA sequence set by random selection. Preferably, the server may perform selection in the following manner: selecting UA sequences whose sequence numbers in the UA sequence set are odd numbers, selecting a UA sequence every k UA sequences, or the like, where k is a natural number greater than 1, for example, 2, 3, or 4. The present invention is not limited thereto. Preferably, an evener distribution of the selected UA sequences in the UA sequence set is better, which can improve fitting accuracy of the mapping function.

Specifically, the server may acquire the first user environment of the UA in the first UA sequence set, use an initial value of the first UE as an independent variable, use a changed value of the first UE as a function value, and perform function fitting, so as to generate the mapping function of the UE.

The UE acquired by the server generally includes an initial value and a changed value of the UE, where the initial value refers to a value before occurrence of the UA, and the changed value refers to a value after the occurrence of the UA. The UE may be a UE of an internal environment of the mobile terminal, may be a UE of an external environment of the mobile terminal, and may also be a combination of both. For example, the UA is starting a media player, the UE is environment volume, the initial value of the UE is 50, and the changed value of the UE is 100.

In addition, in the embodiment, when mapping function fitting is performed, one or more UEs may be acquired. When the acquired UE is a UE of an internal environment, it may be that the initial value of the UE is used as an input parameter of the function, and the changed value of the UE is used as an output parameter of the function. When the acquired UE not only includes the UE of the internal environment but also includes a UE of an external environment, it may be that the initial value of UE of the internal environment is used as an input parameter of the function, the changed value of the UE of the internal environment is used as an output parameter of the function, and the initial value of the UE of the external environment is used as a condition for adjusting the UE of the internal environment. Then, an obtained function is a function for adjusting the UE of the internal environment of the mobile terminal when the UE of the external environment meets the condition.

304: The server acquires all UAs in a remaining UA sequence except the some UA sequences from the UA sequence set to form a second UA sequence set, verifies the mapping function according to a second UE of the UAs in the second UA sequence set, and determines, according to a result of the verifying, whether the mapping function meets a specified requirement.

Specifically, the server may: acquire the second UE of the UAs in the second UA sequence set, use an initial value of the second UE as an independent variable, calculate a function value of the second UE by using the mapping function, and calculate a deviation rate of the mapping function according to the function value of the second UE and a changed value of the second UE; determine whether the deviation rate of the mapping function is less than a preset deviation rate threshold; if yes, determine that the mapping function meets the specified requirement, and otherwise, determine that the mapping function does not meet the specified requirement.

The deviation rate threshold may be set according to a requirement, and the present invention is not limited thereto. For example, the deviation rate threshold may be set to 10% or 5%.

In the embodiment, multiple algorithms may be used to implement the generating and verifying of the mapping function by the server, and the present invention is not limited thereto. For example, a Relevancy Check & Classification (RCC, also called association relationship classification) algorithm may be used for implementation. A specific process is as follows:

(1) For any UA sequence that repeatedly appears N times within preset time, the server groups the N UA sequences to form a UA sequence set, where N≥2; the server sorts the obtained UA sequence set in order of UA occurrence time, groups all UAs in UA sequences that are in odd-number positions to form a first UA sequence set, and groups all UAs in UA sequences that are in even-number positions to form a second UA sequence set.

(2) Acquire a first UE of the UAs in the first UA sequence set, use an initial value of the first UE as an independent variable, use a changed value of the first UE as a function value, and perform function fitting, so as to generate a mapping function.

(3) Acquire a second UE of the UAs in the second UA sequence set, use an initial value of the second UE as an independent variable, calculate a function value of the second UE by using the mapping function, and calculate a deviation rate of the mapping function according to the function value of the second UE and a changed value of the second UE.

(4) Determine whether the obtained deviation rate is less than a preset deviation rate threshold; if yes, determine that the mapping function meets the specified requirement, and otherwise, determine that the mapping function does not meet the specified requirement.

305: If the mapping function meets the specified requirement, determine that UAs in the UA sequence are in a causal association relationship; if the mapping function does not meet the specified requirement, determine that the UAs in the UA sequence are in an aggregate association relationship.

A process of the foregoing steps 303 to 305 may be understood to mean confirmation of an association relationship for a UA sequence that repeatedly appears and is obtained by the server. When the server obtains multiple UA sequences that repeatedly appear, the foregoing process may be repeated for each UA sequence to determine the association relationship, and details are not described herein again. In the embodiment, when a description such as "a UA sequence that repeatedly appears" is used, what is emphasized is whether the UA sequence has an attribute of repetitive appearance, where "a" represents a UA sequence that has such an attribute but not a quantity of times the UA sequence repeatedly appears. For example, when "A UA record has a sequence TC that repeatedly appears" is described, it indicates that the TC sequence has the attribute of repetitive appearance, and a quantity of times the TC sequence repeatedly appears is not described. If a description is required, the description will be specially set forth. For example, the TC sequence repeatedly appears 3 times in the UA record.

To better understand the process of the foregoing steps 303 to 305, the embodiment uses an example, in which the CA sequence repeatedly appears 6 times, for description. The CA sequence may include one UE, and may also include multiple UEs, and it may also be understood that one UE is included but the UE includes multiple parameters (for example, including an external environment parameter and an internal environment parameter). One UE is used as an example for description herein. Specifically, the 6 CA sequences are grouped to form a set, and it is assumed that the set is {CA (a1, b1), CA (a2, b2), CA (a3, b3), CA (a4, b4), CA (a5, b5), CA (a6, b6)}, where a is an initial value of the UE and b is a changed value of the UE. The server obtains a first UA sequence set and a second UA sequence set according to the RCC algorithm, where the first UA sequence set is {CA (a1, b1), CA (a3, b3), CA (a5, b5)}, and the second UA sequence set is {CA (a2, b2), CA (a4, b4), CA (a6, b6)}. The server uses an initial value of a UE of each CA in the first UA sequence set as an independent variable, uses a changed value of the UE as a function value, and performs function fitting, so as to generate a mapping function of a UE of the CA sequence. The server performs calculation by substituting the initial values a2, a4, and a6 of the UE of the CA in the second UA sequence set for the mapping function to obtain function values c2, c4, and c6 of the UE respectively, calculates a deviation rate d2 according to c2 and b2, calculates a deviation rate d4 according to c4 and b4, calculates a deviation rate d6 according to c6 and b6, and determines whether an average value or a root-mean-square value of d2, d4, and d6 is less than a preset average deviation rate threshold. If yes, it is determined that the mapping function meets the specified requirement; otherwise, it is determined that the mapping function does not meet the specified requirement.

306: If the determined association relationship is a causal association relationship, generate a causal use mode corresponding to the causal association relationship, where the causal use mode includes: a first list of UAs that trigger the causal association relationship, a second list of UAs causally associated with the UAs that trigger the causal association relationship, and a mapping function of a UE of a UA in the causal association relationship; if the determined association relationship is an aggregate association relationship, generate an aggregate use mode corresponding to the aggregate association relationship, where the aggregate use mode includes: a third list of UAs that trigger the aggregate association relationship, and a fourth list of UAs aggregately associated with the UAs trigger the aggregate association relationship, or includes: a third list of UAs that trigger the aggregate association relationship, a fourth list of UAs aggregately associated with the UAs that trigger the aggregate association relationship, and a UE of a UA in the aggregate association relationship.

In the embodiment, the association relationship between UAs include an aggregate association relationship and a causal association relationship. The aggregate association relationship indicates that several UAs are not in an obvious causal relationship but usually appear together. For example, when a user starts an application program, other several application programs are also started at the same time. In this case, the UAs of starting these application programs are in the aggregate association relationship. In the case of the aggregate association relationship, there may be a UE that is related to the aggregate association relationship, or there may be no UE that is related to the aggregate association relationship. The causal association relationship indicates that several UAs are in an obvious causal relationship, where running of an application program is to serve another application program. For this causal association, a changed UE thereof and a mapping function of the UE need to be analyzed. For example, when a user opens an e-book at night, screen brightness is generally adjusted. In this case, an operation of opening the e-book and an operation of adjusting the screen brightness are in the causal association relationship, a change in the screen brightness is described by using a mapping function of brightness. For another example, before opening an email, a user enables a data service first. In this case, an operation of opening the email and an operation of enabling the data service are in the aggregate association relationship, and it may be understood that there is no related UE in this scenario.

In the embodiment, the use mode includes a UA that triggers the association relationship and a UA associated with the UA, or the use mode includes a UA that triggers the association relationship, a UA associated with the UA, and a UE of a UA in the association relationship and/or a mapping function of the UE, which may be expressed in the following manner:

$$\text{Pat<trigger condition,execution parameters>;} \quad (2)$$

The trigger condition refers to a first list of UAs that trigger an association relationship, where all UAs that can trigger the use mode are included. When the mobile terminal monitors a UA in the first list of UAs, it is considered that the trigger condition of the use mode is met. If the first list of UAs does not include the UA monitored by the mobile terminal, it is considered that the UA does not meet the trigger condition of the use mode. Further, the trigger condition may further include the first list of UAs that trigger the association relationship and the UE of the UA that triggers the association relationship. In this case, the mobile terminal needs to acquire the first list of UAs that trigger the association relationship and are included in the use mode, and the UE of the UA that triggers the association relationship, and determine whether the first list of UAs includes the monitored UA and a UE of the mobile terminal conforms to the acquired UE. If yes, it is considered that the trigger condition of the use mode is met; otherwise, it is considered that the trigger condition of the use mode is not met.

The execution parameters refer to various parameters related to UAs that are involved in the use mode. When the use mode is a causal use mode, the execution parameters include a second list of UAs causally associated with a UA that triggers a causal association relationship, and a mapping function of a UE of a UA in the causal association relationship. The use mode may be expressed as Pat<(A), (B, UE, UEMF)>, where A represents the first list of UAs that trigger the causal association relationship, B represents the second list of UAs causally associated with the UAs that trigger the causal association relationship, the UE is a UE of a UA in the causal association relationship, and the User Environment Mapping function (UEMF) is a mapping function of the UE.

When the use mode is an aggregate use mode, the execution parameters include a fourth list of UAs aggregately associated with a UA that triggers an aggregate association relationship, or include a fourth list of UAs aggregately associated with a UA that triggers an aggregate association relationship, and a UE of a UA in the aggregate association relationship. The use mode may be expressed as Pat<(X, Y, Z), (X, Y, Z)> or Pat<(X, Y, Z), (X, Y, Z, UE)>, where a third list of UAs that trigger the aggregate association relationship, and the fourth list of UAs aggregately associated with the UAs that trigger the aggregate association relationship are (X,Y,Z), and the UE is a UE of a UA in the aggregate association relationship.

Preferably, a mapping function in the causal use mode may store only a pointer that points to the mapping function, and the mobile terminal can invoke the mapping function stored on the server by using the pointer, which not only saves storage space of the mobile terminal, but also helps the server maintain and update the mapping function.

The embodiment imposes no specific limitation on a format of the use mode, and includes but is not limited to use of the following format:

TYPE-TRIGGER_LEN-TR1[TR2[TR3[ . . . ]]]-
TRIGGER_UE_TAG-Vi-ARG_LEN-A
RG_DATA-UEMF;           (3)

Each parameter in the format is described as follows:

TYPE: 16-bit data of an unsigned integer type, used to identify a type of an association relationship.

TRIGGER_LEN: 8 bits, used to represent a length of a trigger condition.

TR1[TR2[TR3[ . . . ]]]: 16-bit data of the unsigned integer type, used to represent an ID list of UAs that trigger the association relationship, namely, the first list of UAs, where a length is TRIGGER_LEN.

TRIGGER_UE_TAG: 128-bit flag bit string, used to identify a UE of a UA that triggers the use mode.

Vi: 32-digit data of an integer type or a floating point type, used to record a UE value of the UA that triggers the use mode.

ARG_LEN: 32-bit data of the unsigned integer type, used to represent a length of a returned parameter.

ARG_DATA: structure body, including various related parameters returned by the server, and including the following various parameters:

ReletiveID[ ]: used to save an ID list of UAs related to a triggering UA in the case of the aggregate association relationship, namely, the second list of UAs.

UEMF: used to save a pointer of a mapping function of a UE in the case of the causal association relationship, where the mapping function is stored on the server and remotely invoked by the mobile terminal.

307: The server sends the generated use mode to the mobile terminal, so that the mobile terminal uses a use mode corresponding to a monitored UA, and the process is ended.

In the embodiment, the using, by the mobile terminal, a use mode corresponding to a monitored UA may include selecting, by the mobile terminal, the use mode corresponding to the monitored UA from the received use modes, and prompting a user with the corresponding use mode, so that the user selects at least part of the use mode to be executed and/or set on the mobile terminal.

According to the foregoing method provided in the embodiment, a server searches a UA record sent by a mobile terminal for a UA sequence that repeatedly appears, and a corresponding use mode is created according to an association relationship between UAs in the UA sequence that repeatedly appears and is sent to the mobile terminal, thereby implementing that the mobile terminal uses a corresponding use mode according to a monitored UA. The use mode is created based on UAs, and therefore can reflect a use habit of a user, adequately meet the user's personalized requirements, and greatly improve user experience. In addition, the use mode corresponding to the monitored UA can be used according to the monitored UA, so that an application program that corresponds to one or more UAs associated with the UA can be executed, and the user does not need to find, one by one, and execute, one by one, the application programs corresponding to the UAs, which greatly reduces complexity of a user operation, saves the user's time and energy, and improves the user experience.

Embodiment 4

Referring to FIG. 5, the embodiment provides a program execution method, the method is based on a mobile terminal, and a process is specifically as follows:

501: Record a UA that occurs on a mobile terminal within a preset period to obtain a UA record, and send the UA record within the preset period to a server.

For this step, the mobile terminal monitors a UA first. Specifically, there are many methods for monitoring a UA by the mobile terminal, for example, the mobile terminal monitors whether a window is opened or closed. The window is a display area corresponding to an application program on a screen, is a visible interface between a user and the application program that generates the window, and is created and displayed by the application program. When the user starts or exits an application program, the mobile terminal monitors that a window is opened or closed, so as to determine that a UA is generated. Certainly, the mobile terminal may further use another method to monitor a UA, on which no specific limitation is imposed in the embodiment.

To avoid frequent interaction between the mobile terminal and the server, the mobile terminal may preset a temporary storage period, temporarily store an obtained UA record in the mobile terminal, and send, when the period ends, a UA record within the period to the server. The preset period may be set according to a requirement, and the embodiment of the present invention imposes no specific limitation thereto. A longer period indicates a larger data volume processed by the server. The user may set a period for sending a UA record according to an actual condition. For example, the period is set to 10 days, 15 days, or one month. By using this manner, transmission efficiency of data can be improved, and consumption of network traffic of the user can be reduced.

In the embodiment, a UA record stored in the mobile terminal may use multiple storage formats, and the present invention is not limited thereto. Preferably, the foregoing expression (1) may be used. For details, refer to the description in the foregoing embodiment, and the details are not described herein again.

As an embodiment of the present invention, before sending a UA record to the server, the mobile terminal may further compress the UA record so as to further improve the transmission efficiency. As another embodiment of the present invention, before sending a UA record, the mobile terminal may further perform optimization processing on data, so as to save storage space of the data, and improve the transmission efficiency of the data. The optimization processing includes: when a UA occurs on the mobile terminal for the first time, recording the UA that occurs for the first time and a UE of the UA; when the UA occurs on the mobile terminal not for the first time, finding, in a UE of the UA of this time, a UE that is different from a UE of a UA of last time, and recording the UA of this time and the found UE. The UE may refer to an environment in which the mobile terminal is located during occurrence, before occurrence, or after occurrence of a UA, and may include one or more of the following: time, location, temperature, light, volume of an external environment, volume of the mobile terminal, gravity, and screen lightness. In this manner, only a UE that is different from a UE of a UA of last time is recorded in a UA record each time, and a same UE is no longer repeatedly recorded, so that the storage space of the mobile terminal is greatly saved. Certainly, as still another embodiment of the present invention, the mobile terminal may further perform compression on a basis of the optimization processing, and then send compressed data to the server, so that a better effect is achieved.

For example, a user environment of the mobile terminal includes a, b, c, d, and e, and the first 5 bits of TAG flag bits are obtained to identify the user environment. For ease of description, the remaining 123 bits of the TAG flag bits are omitted. In an actual application, the 123 bits of the flag bits may be set to 0. A first UA record is A, a flag bit string is 11100, which indicates that A includes three UEs: a, b, and c; a second UA record is B, a flag bit string is 00110, and the second UA record includes two UEs: c and d; a third UA record is C, a flag bit string is 00111, and the third UA record includes three UEs: c, d, and e. In this case, the UA records stored in the mobile terminal may use the following form: (A, 11100, <a, b, c>), (B, 00110, <d>), (C, 00111, <e>). Certainly, in an actual application, another form may also be used for recording, and the present invention is not limited thereto.

The foregoing optimization processing and compression processing on the data may greatly reduce a data processing volume of the server, which is described in the following by using an example. When a preset period for uploading a UA record is set to 30 days, if an appearance frequency θ of a UA is 100 times/hour and time Td for using the mobile terminal by the user every day equals 16 hours/day, the saturated UA records that need to be processed by the server each time is N=θ×Td×T=48000 (times). According to the foregoing format of the UA record, the data volume includes space occupied by an ID, a TAG, and a UE. If calculation is performed on a basis that an average quantity of valid UEs is 64, each UE occupies 4 bytes, a rate of data deduction after recording is 80%, and compression efficiency of a compression algorithm is 80%, a maximum data volume of one month is: Data=(2+16+64×4) (Byte)×48000×80%×80%=8.22 megabytes (MB). The mobile terminal sends the data to the server for processing, so that memory space of the mobile terminal may be saved, and impact on Central Processing Unit (CPU) performance of the mobile terminal is reduced; the server processes the UA record to generate a use mode, and then returns the use mode to the mobile terminal, so as to reduce consumption of a resource of the mobile terminal and also facilitate an update and replacement of a program execution algorithm.

In addition, after the mobile terminal sends the UA record to the server, the mobile terminal can clean a historical UA record that has been already processed in time, thereby reduce memory occupied by the mobile terminal and saving the storage space.

502: The mobile terminal receives use modes returned by the server.

The use mode returned by the server is created by the server according to an association relationship after the server searches the UA record for a UA sequence that repeatedly appears and determines the association relationship between UAs in the UA sequence. Specifically, the use mode may include a UA that triggers the association relationship and a UA associated with the UA, or the use mode may include a UA that triggers the association relationship, a UA associated with the UA, and a UE of a UA in the association relationship and/or a mapping function of the UE. A specific process is the same as the description in the foregoing embodiment, and details are not described herein again.

503: When a UA is monitored, the mobile terminal determines whether at least one first use mode exists in the use mode, where a list of UAs that are included in the first use mode and trigger the association relationship includes the monitored UA, or a list of UAs that are included in the first use mode and trigger the association relationship includes the monitored UA, and a UE of the UA conforms to a UE specified in a mapping function. If yes, 504 is executed; otherwise, it is determined that the monitored UA does not meet a trigger condition of the use mode, and the process is ended.

The use mode generally refers to a plurality of use modes. Therefore, when the UA is monitored, the mobile terminal determines whether at least one first use mode exists in the use modes. The first use mode is a use mode whose trigger condition is met. The list of UAs that trigger the association relationship refers to a list of UAs involved in the association relationship in the first use mode, and the list of UAs may be considered as a trigger condition of the first use mode, where all UAs that can trigger the association relationship in the first use mode are included, or all UAs that can trigger the association relationship in the first use mode, and a UE of a UA that triggers the association relationship are included. When the mobile terminal determines that the list of UAs that are included in the first use mode and trigger the association relationship includes the monitored UA, or determines that the list of UAs that are included in the first use mode and trigger the association relationship includes the monitored UA and the UE of the UA that triggers the association relationship conforms to the UE specified in the mapping function, it is considered that the trigger condition of the use mode is met. If it is determined that the list of UAs that are included in the first use mode and trigger the association relationship does not include the UA monitored by the mobile terminal, or it is determined that the list of UAs that are included in the first use mode and trigger the association relationship includes the monitored UA but the UE of the UA that triggers the association relationship does not conform to the UE specified in the mapping function, it is considered that the UA does not meet the trigger condition of the use mode.

That a UE of the mobile terminal conforms to the UE specified in the mapping function may be that the UE of the mobile terminal is less than or equal to a preset UE threshold in the mapping function, for example, external light of the mobile terminal being less than or equal to a light threshold, and certainly may be that the UE of the mobile terminal is greater than or equal to the preset UE threshold in the mapping function, for example, external environment volume of the mobile terminal being greater than or equal to a preset volume threshold. The present invention is not limited thereto.

For example, if a monitored UA1 is starting a browser and it is determined that the list of UAs that trigger the association relationship includes the UA1, it is considered that the UA1 meets the trigger condition. Alternatively, if a monitored UA2 is opening an e-book, and it is determined that the list of UAs that trigger the association relationship includes the UA2 and current external light of the mobile terminal is less than a preset light threshold, it is considered that the UA2 meets the trigger condition.

When multiple use modes are stored in the mobile terminal, the multiple use modes may be searched for all use modes that can be triggered by the monitored UA. For example, the multiple use modes may be traversed in sequence to determine whether the monitored UA can trigger the use modes, so that all use modes that can be triggered by the UA are obtained.

504: The mobile terminal determines that the monitored UA meets a trigger condition of the at least one use mode of the received use modes, and prompts a user with the at least one use mode whose trigger condition is met, so that the user selects at least part of the use mode to be executed and/or set on the mobile terminal.

For example, when the mobile terminal monitors that the user starts a data service, a use mode corresponding to the starting of the data service is selected from the received use modes: opening an email or starting a browser, and the user is prompted with these two operations of opening an email and starting a browser, so that the user selects the operation of opening an email or starting a browser, or the operations of opening an email and starting a browser to be executed.

In the embodiment, optionally, after the mobile terminal determines that the monitored UA meets the trigger condition of the at least one use mode of the received use modes, the at least one use mode whose trigger condition is met may further be used in the following manner: if the at least one use mode whose trigger condition is met is a causal use mode, acquiring a second list of UAs causally associated with the UA and included in the causal use mode, and a mapping function of a UE of a UA in the causal association relationship, acquiring a current UE of the mobile terminal, calculating a function value of the current UE by using the mapping function, executing at least some of the UAs in the second list of UAs on the mobile terminal, and setting a UE of the mobile terminal according to the function value of the current UE; and if the at least one use mode whose trigger condition is met is an aggregate use mode, acquiring a fourth list of UAs aggregately associated with the UA and included in the aggregate use mode, and executing at least some of the UAs in the fourth list of UAs on the mobile terminal; or acquiring a fourth list of UAs aggregately associated with the UA and included in the aggregate use mode, and a UE of a UA in the aggregate association relationship, executing at least some of the UAs in the fourth list of UAs on the mobile terminal, and setting a UE of the mobile terminal according to the UE that is acquired.

Further, in the aggregate use mode, the mobile terminal may further first ask the user whether to perform a setting related to the aggregate use mode. Specifically, after the fourth list of UAs is acquired, the user may be asked whether to execute a UA in the fourth list of UAs on the mobile terminal, and if yes, the UA in the fourth list of UAs is executed on the mobile terminal. Alternatively, after the fourth list of UAs and the UE are acquired, the user may be asked whether to execute a UA in the fourth list of UAs on the mobile terminal and set the UE, and if yes, the UA in the fourth list of UAs is executed on the mobile terminal and the UE of the mobile terminal is set according to the acquired UE. Certainly, in the process, the user may be further asked to select UAs in the fourth list of UAs for execution, and the specified UAs are executed according to the user's selection, thereby greatly meeting the user's personalized requirements and improving user experience.

For example, when the mobile terminal monitors an operation of starting a media player, if an ID1 of the media player in the first list of UAs is matched, and it is determined to trigger the causal use mode is determined, the second list of UAs is acquired, where an ID2 of an application program of adjusting volume is included, and a mapping function UEMF1 of adjusting volume is acquired. Therefore, the mobile terminal starts the application program of adjusting volume on the mobile terminal according to the ID2, acquires current volume, calculates a changed value of the volume by using the UEMF1, and sets volume of the mobile terminal to the changed value, so that setting of the causal use mode is completed. The mapping function UEMF may be that a mapping function on the server is remotely invoked, the current volume of the mobile terminal is input, as an independent variable, to the mapping function, and an output value of the mapping function is used as the changed value of the volume for adjusting the current volume.

For another example, when the mobile terminal monitors an operation of opening an e-book, if an ID3 of the e-book in the third list of UAs is matched, and it is determined to trigger the aggregate use mode, the fourth list of UAs is acquired, where an ID4 of background music is included. Then, the mobile terminal automatically starts the background music according to the ID4, thereby simplifying a user operation and improving user experience. For improvement in humanization and friendliness, the user may first be asked whether to start the background music, and the background music is started upon confirmation of the user.

For still another example, when the mobile terminal monitors a shutdown operation, if an ID5 of a shutdown application program in the third list of UAs is matched, and it is determined to trigger the aggregate use mode, the fourth list of UAs is acquired, where an ID6 of setting an alarm watch is included. Then, a dialog box is displayed, asking the user whether setting the alarm watch is required. If the user chooses yes, it is acquired that a UE included in the use mode is 6:30, and the mobile terminal starts an application program of setting the alarm watch according to the ID6 and automatically sets the alarm watch to 6:30 according to the UE, so that the user does not need to manually perform the setting, thereby bringing great convenience for use of the user, simplifying a user operation, and improving user experience. Certainly, the mobile terminal may also first ask the user whether to set the alarm watch to 6:30 or another expected value. If the user chooses 6:30, a corresponding setting is performed.

Figure 6A:
FIGS. 6A and 6B are schematic interface diagrams of sorting icons according to an aggregate association relationship according to Embodiment 4 of the present invention.
Figure 6B:

Referring to FIGS. 6A AND 6B, FIGS. 6A AND 6B is a schematic interface diagram of sorting icons according to an aggregate association relationship according to the embodiment of the present invention. An aggregate use mode is stored in the mobile terminal in advance, where the third list of UAs includes an ID7, an ID8, an ID9, and ID10 of four application programs, namely, Vber, camera, map, and Lookout. When the mobile terminal monitors that one of the four application programs is started, such as the Vber, after the ID7 of the Vber is matched according to the third list of UAs, it is determined to trigger the aggregate use mode, and the fourth list of UAs is acquired, where an ID11 of an application program of sorting icons is included. The mobile terminal starts the application program of sorting icons according to the ID11, determines IDs of to-be-sorted application programs according to the third list of UAs: ID8, ID9, and ID10, and automatically sorts icons of the three application programs camera, map, and Lookout around the application program Vber according to the determined IDs, so as to help the user quickly find an icon and invoke a corresponding application program, thereby bringing great convenience for a user operation.

According to the foregoing method provided in the embodiment, a mobile terminal receives use modes returned by a server, when a UA is monitored, it is determined whether the UA meets a trigger condition of at least one use mode, and if yes, the at least one use mode whose trigger condition is met is used on the mobile terminal, thereby implementing that the mobile terminal uses a corresponding use mode according to a monitored UA. The use mode is created based on UAs, and therefore can reflect a use habit of a user, adequately improve the user's personalized requirements, and greatly improve user experience. In addition, the use mode corresponding to the monitored UA can be used according to the monitored UA, so that an application program that corresponds to one or more UAs associated with the UA can be executed, and the user does not need to find, one by one, and execute, one by one, the application programs corresponding to the UAs, which greatly reduces complexity of a user operation, saves the user's time and energy, and improves the user experience.

Embodiment 5

The embodiment provides a program execution method, which may include:

acquiring a user action UA record; searching the UA record for a UA sequence that repeatedly appears, and determining an association relationship between UAs in the UA sequence; creating a corresponding use mode according to the association relationship; and when a mobile terminal monitors a UA, determining whether the UA meets a trigger condition of at least one use mode of the use modes, and if yes, using the at least one use mode whose trigger condition is met on the mobile terminal, wherein the user action refers to an operation performed on an application program on the mobile terminal.

In the foregoing method, the steps of acquiring a user action UA record, searching the UA record for a UA sequence that repeatedly appears, determining an association relationship between UAs in the UA sequence, and creating a corresponding use mode according to the association relationship may be performed by the mobile terminal, or may be performed by a server, or may be partly performed by the mobile terminal and partly performed a server. The present invention is not limited thereto. Specifically, when all of the foregoing steps are performed by the mobile terminal, the method embodiment may be understood as an embodiment in which the method is implemented on a mobile terminal side.

The following provides specific description with reference to a figure.

Figure 7:
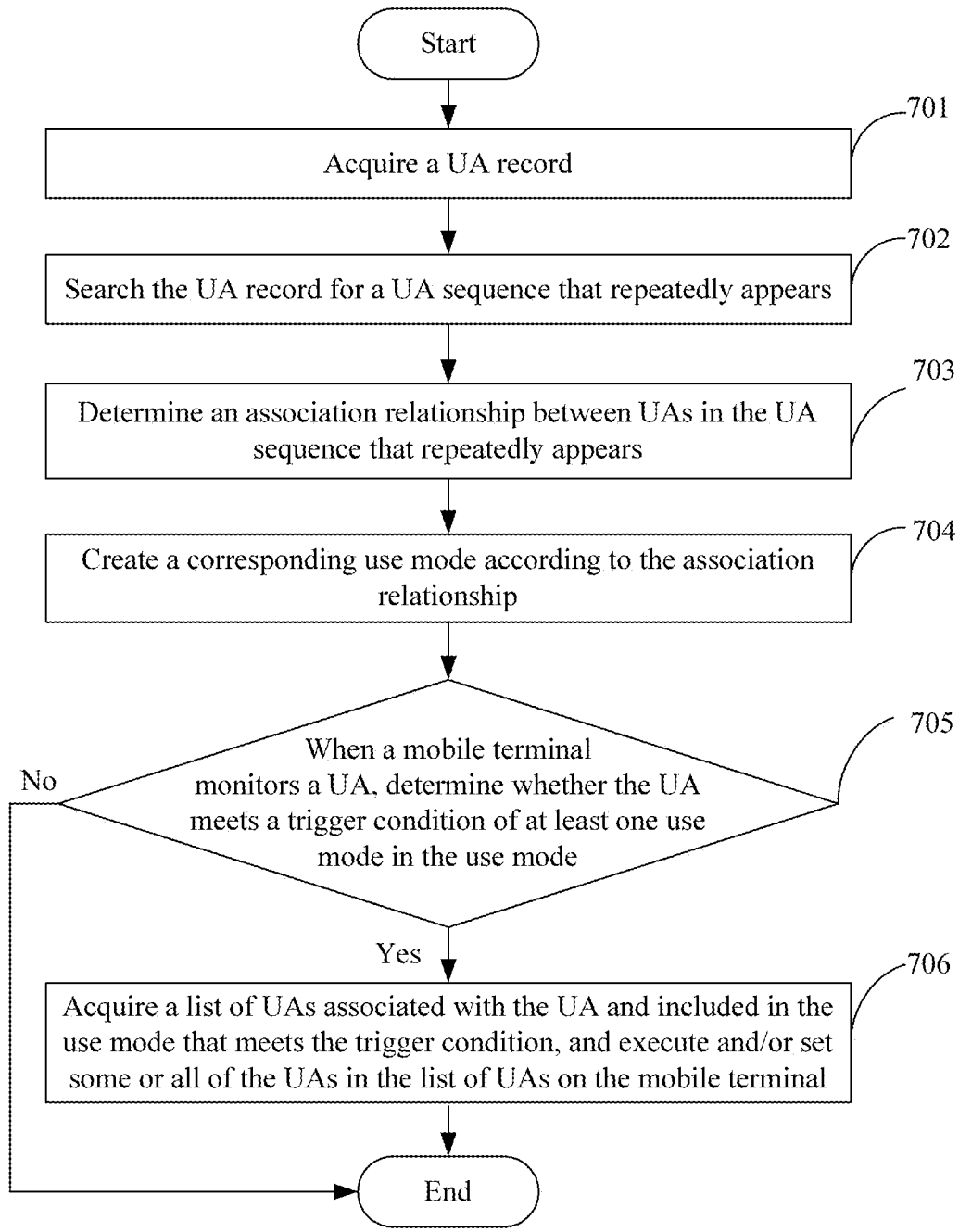
FIG. 7 is a flowchart of a program execution method according to Embodiment 5 of the present invention.

Referring to FIG. 7, the foregoing program execution method may specifically include:

701: Acquire a UA record.

In the embodiment, it may be that the server acquires the UA record, and specifically is that the server receives the UA record sent by the mobile terminal, and for details, refer to the description in step 301. Alternatively, it may be that the mobile terminal acquires the UA record, and may specifically be that a UA that occurs on the mobile terminal within a preset period is recorded to obtain the UA record, and for details, reference may be made to the description in step 401.

702: Search the UA record for a UA sequence that repeatedly appears.

In the embodiment, specifically, the server may search the received UA record for a UA sequence that appears at a frequency higher than a preset threshold, or the mobile terminal searches the acquired UA record a the UA sequence that appears at the frequency higher than a preset threshold, as described in step 302.

703: Determine an association relationship between UAs in the UA sequence that repeatedly appears.

Specifically, the server or the mobile terminal may determine the association relationship in the following manner: for any UA sequence that repeatedly appears N times within preset time, grouping the N UA sequences to form a UA sequence set, where N≥2; and acquiring some UA sequences from the UA sequence set, using all UAs in the some UA sequences to form a first UA sequence set, and generating, according to a first UE of the UAs in the first UA sequence set, a mapping function of the UE of the UA sequence; acquiring all UAs in a remaining UA sequence except the some UA sequences from the UA sequence set to form a second UA sequence set, verifying the mapping function according to a second UE of the UAs in the second UA sequence set, and determining, according to a result of the verifying, whether the mapping function meets a specified requirement; and if the mapping function meets the specified requirement, determining that the UAs in the UA sequence are in a causal association relationship; and if the mapping function does not meet the specified requirement, determining that the UAs in the UA sequence are in an aggregate association relationship.

704: Create a corresponding use mode according to the association relationship.

Specifically, the server or the mobile terminal may create the use mode in the following manner: if the determined association relationship is the causal association relationship, generating a causal use mode corresponding to the causal association relationship, where the causal use mode includes: a first list of UAs that trigger the causal association relationship, a second list of UAs causally associated with the UAs that trigger the causal association relationship, and a mapping function of a UE of a UA in the causal association relationship; and if the determined association relationship is the aggregate association relationship, generating an aggregate use mode corresponding to the aggregate association relationship, where the aggregate use mode includes: a third list of UAs that trigger the aggregate association relationship, and a fourth list of UAs aggregately associated with the UAs that trigger the aggregate association relationship, or includes: a third list of UAs that trigger the aggregate association relationship, a fourth list of UAs aggregately associated with the UAs that trigger the aggregate association relationship, and a UE of a UA in the aggregate association relationship.

705: When a mobile terminal monitors a UA, determine whether the UA meets a trigger condition of at least one use mode of the use modes. If yes, execute step 706; otherwise, the process is ended.

706: Acquire a list of UAs associated with the UA and included in the at least one use mode whose trigger condition is met, and execute and/or set at least some of the UAs in the list of UAs on the mobile terminal. The process is ended.

On a basis of the step, preferably, the method may further include: acquiring a UE of a UA that is in the association relationship and included in the at least one use mode whose trigger condition is met, and setting a UE of the mobile terminal according to the UE that is acquired; or acquiring a mapping function of a UE of a UA that is in the association relationship and included in the at least one use mode whose trigger condition is met, acquiring a current UE of the mobile terminal, calculating a function value of the current UE by using the mapping function, and setting a UE of the mobile terminal according to the function value of the current UE.

Certainly, in the embodiment, after the mobile terminal determines that the monitored UA meets the trigger condition of the at least one use mode of the use modes, the at least one use mode whose trigger condition is met may further be used in the following manner: if the at least one use mode whose trigger condition is met is a causal use mode, acquiring a second list of UAs causally associated with the UA and included in the causal use mode, and a mapping function of a UE of a UA in the association relationship, acquiring a current UE of the mobile terminal, calculating a function value of the current UE by using the mapping function, executing at least some of the UAs in the second list of UAs on the mobile terminal, and setting a UE of the mobile terminal according to the function value of the current UE; and if the at least one use mode whose trigger condition is met is an aggregate use mode, acquiring a fourth list of UAs aggregately associated with the UA and included in the aggregate use mode, and executing at least some of the UAs in the fourth list of UAs on the mobile terminal; or acquiring a fourth list of UAs aggregately associated with the UA and included in the aggregate use mode, and a UE of a UA in the association relationship, executing at least some of the UAs in the fourth list of UAs on the mobile terminal, and setting a UE of the mobile terminal according to the UE that is acquired.

In addition, optionally, the method may further include: prompting, by the mobile terminal, a user with the at least one use mode whose trigger condition is met, so that the user selects at least part of the use mode to be executed and/or set on the mobile terminal. Specifically, it may be that the user selects at least some of the UAs, which are included in the use mode and associated with the UA that triggers the association relationship, to be executed and/or set on the mobile terminal, where execution may be one-time execution, and setting may be understood as: by means of a setting this time, an operation that is the same as that of this time is performed each time afterwards.

According to the foregoing method provided in the embodiment, an acquired UA record is searched for a UA sequence that repeatedly appears, and a corresponding use mode is created according to an association relationship between UAs in the UA sequence that repeatedly appears, thereby implementing that a mobile terminal uses a corresponding use mode according to a monitored UA. The use mode is created based on UAs, and therefore can reflect a use habit of a user, adequately meet the user's personalized requirements, and greatly improve user experience. In addition, the use mode corresponding to the monitored UA can be used according to the monitored UA, so that an application program that corresponds to one or more UAs associated with the UA can be executed, and the user does not need to find, one by one, and execute, one by one, the application programs corresponding to the UAs, which greatly reduces complexity of a user operation, saves the user's time and energy, and improves the user experience.

Embodiment 6

Figure 8:
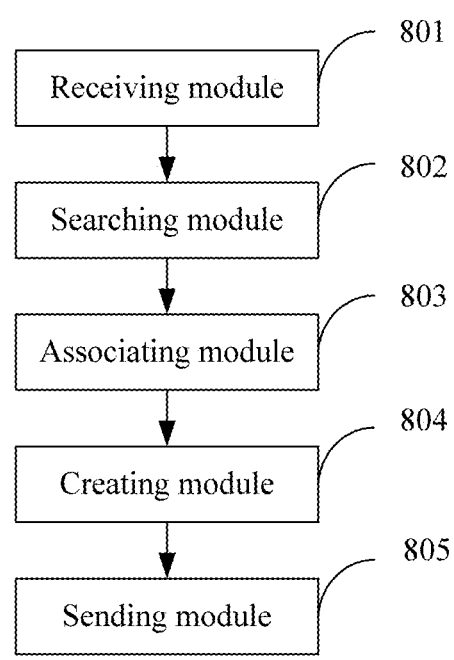
FIG. 8 is a schematic structural diagram of a server according to Embodiment 6 of the present invention.

Referring to FIG. 8, the embodiment provides a server, where the server includes: a receiving module 801 configured to receive a user action UA record sent by a mobile terminal; a searching module 802 configured to search the UA record received by the receiving module 801 for a UA sequence that repeatedly appears, where the UA sequence includes at least two UAs; an associating module 803 configured to determine an association relationship between UAs in the UA sequence that repeatedly appears; a creating module 804 configured to create a corresponding use mode according to the association relationship determined by the associating module 803; and a sending module 805 configured to send the use mode to the mobile terminal, so that the mobile terminal uses a use mode corresponding to a monitored UA, wherein the user action refers to an operation performed on an application program on the mobile terminal.

Figure 9:
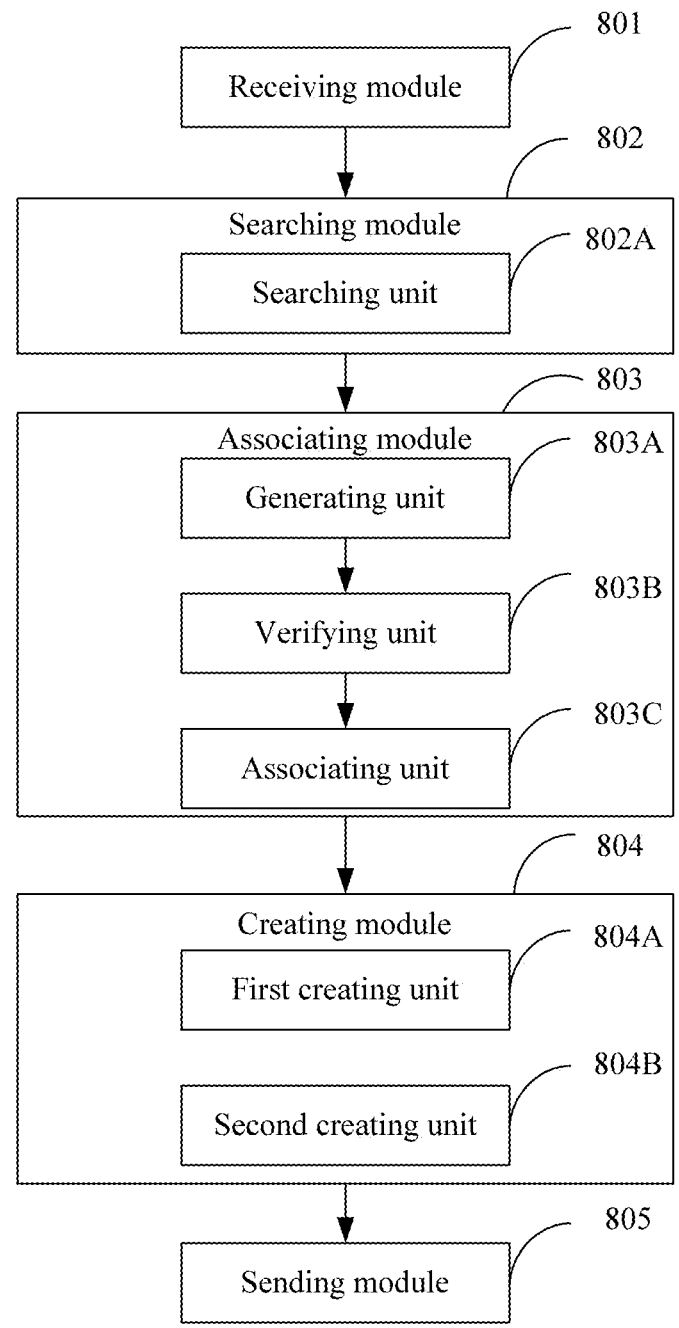
FIG. 9 is a schematic structural diagram of another server according to Embodiment 6 of the present invention.

Referring to FIG. 9, in the embodiment, the searching module 802 may include: a searching unit 802A configured to search the UA record for a UA sequence that appears at a frequency higher than a preset threshold.

In the embodiment, the searching unit 802A may be specifically configured to search the UA record for a UA sequence of which a quantity of appearance times within preset time is higher than a preset threshold.

Referring to FIG. 9, in the embodiment, the associating module 803 may include: a generating unit 803A configured to: for any UA sequence that repeatedly appears N times within preset time, group the N UA sequences to form a UA sequence set, where N≥2; and acquire some UA sequences from the UA sequence set, use all UAs in the some UA sequences to form a first UA sequence set, and generate, according to a first user environment UE of the UAs in the first UA sequence set, a mapping function of the UE of the UA sequence; a verifying unit 803B configured to: acquire all UAs in a remaining UA sequence except the some UA sequences from the UA sequence set to form a second UA sequence set; verify the mapping function according to a second UE of the UAs in the second UA sequence set; and determine, according to a result of the verifying, whether the mapping function meets a specified requirement; and an associating unit 803C configured to: if the result of the verifying by the verifying unit 803B is that the mapping function meets the specified requirement, determine that the UAs in the UA sequence are in a causal association relationship; and if the result of the verifying by the verifying unit 803B is that the mapping function does not meet the specified requirement, determine that the UAs in the UA sequence are in an aggregate association relationship; where the mapping function of the UE is obtained after function fitting is performed by using an initial value of the UE as an independent variable and using a changed value of the UE as a function value, where the initial value of the UE refers to a value of the UE before a UA occurs, and the changed value of the UE refers to a value of the UE after a UA occurs.

Figure 10:
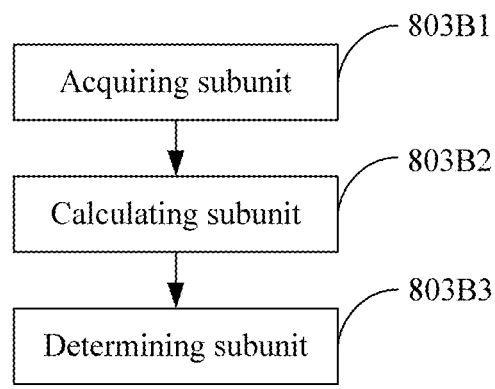
FIG. 10 is a schematic structural diagram of a verifying unit according to Embodiment 6 of the present invention.

Referring to FIG. 10, in the embodiment, the verifying unit 803B may include: an acquiring subunit 803B1 configured to acquire the second UE of the UAs in the second UA sequence set; a calculating subunit 803B2 configured to: use an initial value of the second UE as an independent variable, calculate a function value of the second UE by using the mapping function, and calculate an average deviation rate of the mapping function according to the function value of the second UE and a changed value of the second UE; and a determining subunit 803B3 configured to: determine whether the average deviation rate of the mapping function is less than a preset deviation rate threshold; if yes, determine that the mapping function meets the specified requirement, and otherwise, determine that the mapping function does not meet the specified requirement.

Referring to FIG. 9, in the embodiment, the creating module 804 may include: a first creating unit 804A configured to: if the association relationship is the causal association relationship, generate a causal use mode corresponding to the causal association relationship, where the causal use mode includes: a first list of UAs that trigger the causal association relationship, and a second list of UAs causally associated with the UAs that trigger the causal association relationship, and a mapping function of a UE of a UA in the causal association relationship; and a second creating unit 804B configured to: if the association relationship is the aggregate association relationship, generate an aggregate use mode corresponding to the aggregate association relationship, where the aggregate use mode includes: a third list of UAs that trigger the aggregate association relationship, and a fourth list of UAs aggregately associated with the UAs that trigger the aggregate association relationship, or includes: a third list of UAs that trigger the aggregate association relationship, a fourth list of UAs aggregately associated with the UAs that trigger the aggregate association relationship, and a UE of a UA in the aggregate association relationship.

The foregoing server provided in the embodiment can execute the program execution method provided in any one of the foregoing method embodiments. For details about a specific process, refer to descriptions in the method embodiments, and details are not described herein again.

According to the server provided in the embodiment, a UA record sent by a mobile terminal is searched for a UA sequence that repeatedly appears, and a corresponding use mode is created according to an association relationship between UAs in the UA sequence that repeatedly appears and is sent to the mobile terminal, thereby implementing that the mobile terminal uses a corresponding use mode according to a monitored UA. The use mode is created based on UAs, and therefore can reflect a use habit of a user, adequately meet the user's personalized requirements, and greatly improve user experience. In addition, the user does not need to perform setting for application programs one by one, thereby greatly reducing complexity of an operation, saving the user's time and energy, and enhancing availability of the mobile terminal.

Embodiment 7

Figure 11:
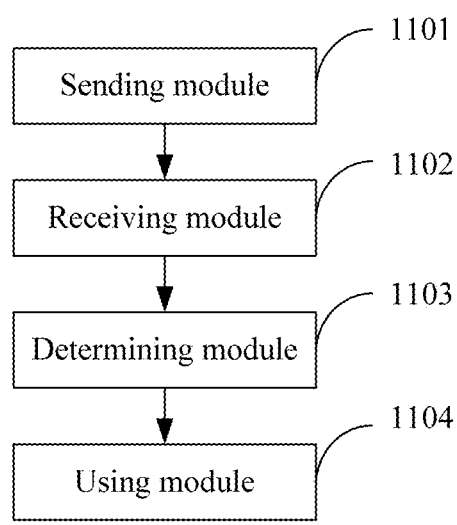
FIG. 11 is a schematic structural diagram of a mobile terminal according to Embodiment 7 of the present invention.

Referring to FIG. 11, the embodiment provides a mobile terminal, where the mobile terminal includes: a sending module 1101 configured to send a user action UA record to a server; a receiving module 1102 configured to receive a use mode returned by the server; a determining module 1103 configured to: when the mobile terminal monitors a UA, determine whether the UA meets a trigger condition of at least one use mode of the use modes; and a using module 1104 configured to: if the determining module 1103 determines that the UA meets the trigger condition of the at least one use mode of the use modes, use the at least one use mode whose trigger condition is met on the mobile terminal, wherein the user action refers to an operation performed on an application program on the mobile terminal, and the use mode is created by the server according to an association relationship after the server searches the UA record for a UA sequence that repeatedly appears and determines the association relationship between UAs in the UA sequence.

In the embodiment, the sending module 1101 may include: a recording unit configured to record a UA that occurs on the mobile terminal within a preset period to obtain the UA record; and a sending unit configured to send the UA record within the preset period to the server.

In the embodiment, the mobile terminal may further include: a first recording module configured to: when a UA occurs on the mobile terminal for the first time, record the UA that occurs for the first time and a UE of the UA; a second recording module configured to: when the UA occurs on the mobile terminal not for the first time, find, in a UE of the UA of this time, a UE that is different from a UE of a UA of last time, and record the UA of this time and the found UE; and correspondingly, the sending module 1101 configured to send the UA record to the server according to a result recorded by the first recording module and the second recording module.

In the embodiment, the determining module is configured to: determine whether at least one first use mode exists in the use mode, where a first list of UAs that are included in the first use mode and trigger an association relationship includes the monitored UA, or a first list of UAs that are included in the first use mode and trigger an association relationship includes the monitored UA, and a UE of the UA conforms to a UE of a UA that is included in the first use mode and triggers the association relationship; and if yes, determine that the UA meets the trigger condition of the at least one use mode of the use modes; and otherwise, determine that the UA does not meet the trigger condition of the at least one use mode of the use modes.

In the embodiment, the use mode includes a UA that triggers the association relationship and a UA associated with the UA; or the use mode includes a UA that triggers the association relationship, a UA associated with the UA, and a UE of a UA in the association relationship and/or a mapping function of the UE.

In the embodiment, the using module 1104 may include: a first using unit configured to: if the use mode is a causal use mode, acquire a second list of UAs causally associated with the UA and included in the causal use mode, and a mapping function of a UE of a UA in the causal association relationship, acquire a current UE of the mobile terminal, calculate a function value of the current UE by using the mapping function, execute at least some of the UAs in the second list of UAs on the mobile terminal, and set a UE of the mobile terminal according to the function value of the current UE; and a second using unit configured to: if the use mode is an aggregate use mode, acquire a fourth list of UAs aggregately associated with the UA and included in the aggregate use mode, and execute at least some of the UAs in the fourth list of UAs on the mobile terminal; or acquire a fourth list of UAs aggregately associated with the UA and included in the aggregate use mode, and a UE of a UA in the association relationship, execute at least some of the UAs in the fourth list of UAs on the mobile terminal, and set a UE of the mobile terminal according to the UE that is acquired.

The foregoing mobile terminal provided in the embodiment can execute the program execution method provided in any one of the foregoing method embodiments. For details about a specific process, refer to descriptions in the method embodiments, and details are not described herein again.

According to the mobile terminal provided in the embodiment, use modes returned by a server are received, when a UA is monitored, it is determined whether the UA meets a trigger condition of at least one use mode, and if yes, the at least one use mode whose trigger condition is met is set on the mobile terminal, thereby implementing that the mobile terminal uses a corresponding use mode according to a monitored UA. The use mode is created based on UAs, and therefore can reflect a use habit of a user, adequately meet the user's personalized requirements, and greatly improve user experience. In addition, the user does not need to perform setting for application programs one by one, thereby greatly reducing complexity of an operation, saving the user's time and energy, and enhancing availability of the mobile terminal.

Embodiment 8

Figure 12:
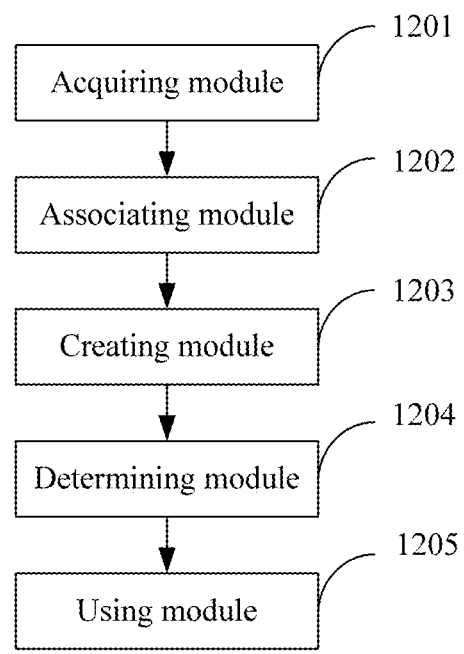
FIG. 12 is a schematic structural diagram of a mobile terminal according to Embodiment 8 of the present invention.

Referring to FIG. 12, the embodiment provides a mobile terminal, where the mobile terminal includes: an acquiring module 1201 configured to acquire a user action UA record; an associating module 1202 configured to search the UA record for a UA sequence that repeatedly appears, and determine an association relationship between UAs in the UA sequence; a creating module 1203 configured to create a corresponding use mode according to the association relationship determined by the associating module 1202; a determining module 1204 configured to: when a UA is monitored, determine whether the UA meets a trigger condition of at least one use mode of the use modes; and a using module 1205 configured to: if the determining module determines that the UA meets the trigger condition of the at least one use mode of the use modes, use the at least one use mode whose trigger condition is met on the mobile terminal, wherein.

The user action refers to an operation performed on an application program on the mobile terminal. The mobile terminal may include but is not limited to: a user terminal device, such as a PC, a tablet computer, a mobile phone, and a PDA, and the present invention is not limited thereto. The embodiment may be applied on a PC.

In the embodiment, the using module 1205 may be configured to: if the determining module determines that the UA meets the trigger condition of the at least one use mode of the use modes, acquire a list of UAs associated with the UA and included in the at least one use mode whose trigger condition is met, and execute or set at least some of the UAs in the list of UAs on the mobile terminal.

In the embodiment, the using module 1205 may be further configured to: acquire a UE of a UA that is in the association relationship and included in the at least one use mode whose trigger condition is met, and set a UE of the mobile terminal according to the UE that is acquired; or acquire a mapping function of a UE of a UA that is in the association relationship and included in the at least one use mode whose trigger condition is met, acquire a current UE of the mobile terminal, calculate a function value of the current UE by using the mapping function, and set a UE of the mobile terminal according to the function value of the current UE.

In the embodiment, the using module 1205 may include: a first using unit configured to: if the at least one use mode whose trigger condition is met is a causal use mode, acquire a second list of UAs causally associated with the UA and included in the causal use mode, and a mapping function of a UE of a UA in the association relationship, acquire a current UE of the mobile terminal, calculate a function value of the current UE by using the mapping function, execute at least some of the UAs in the second list of UAs on the mobile terminal, and set a UE of the mobile terminal according to the function value of the current UE; and a second using unit configured to: if the at least one use mode whose trigger condition is met is an aggregate use mode, acquire a fourth list of UAs aggregately associated with the UA and included in the aggregate use mode, and execute at least some of the UAs in the fourth list of UAs on the mobile terminal; or acquire a fourth list of UAs aggregately associated with the UA and included in the aggregate use mode, and a UE of a UA in the association relationship, execute at least some of the UAs in the fourth list of UAs on the mobile terminal, and set a UE of the mobile terminal according to the UE that is acquired.

In the embodiment, the using module 1205 may be configured to: prompt a user with the at least one use mode whose trigger condition is met, so that the user selects at least part of the use mode to be executed and/or set on the mobile terminal.

According to the mobile terminal provided in the embodiment and the foregoing method provided in the embodiment, an acquired UA record is searched for a UA sequence that repeatedly appears, and a corresponding use mode is created according to an association relationship between UAs in the UA sequence that repeatedly appears, thereby implementing that a mobile terminal uses a corresponding use mode according to a monitored UA. The use mode is created based on UAs, and therefore can reflect a use habit of a user, adequately meet the user's personalized requirements, and greatly improve user experience. In addition, the user does not need to perform setting for application programs one by one, thereby greatly reducing complexity of an operation, saving the user's time and energy, and enhancing ease of use of the mobile terminal.

Embodiment 9

Figure 13:
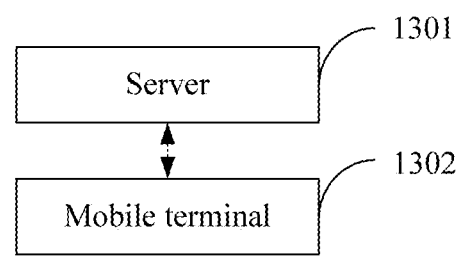
FIG. 13 is a schematic structural diagram of a program execution system according to Embodiment 9 of the present invention.

Referring to FIG. 13, the embodiment provides a program execution system, where the system includes a server 1301 and a mobile terminal 1302. A function of the server 1301 is the same as a function described in the foregoing server embodiment, a function of the mobile terminal 1302 is the same as a function described in the foregoing mobile terminal embodiment, and details are not described herein again.

The program execution system provided in the embodiment can execute the program execution method provided in any one of the foregoing method embodiments. For details about a specific process, refer to descriptions in the method embodiments, and details are not described herein again.

According to the program execution system provided in the embodiment, a UA record sent by a mobile terminal is searched for a UA sequence that repeatedly appears, and a corresponding use mode is created according to an association relationship between UAs in the UA sequence that repeatedly appears and is sent to the mobile terminal, thereby implementing that the mobile terminal uses a corresponding use mode according to a monitored UA. The use mode is created based on UAs, and therefore can reflect a use habit of a user, adequately meet the user's personalized requirements, and greatly improve user experience. In addition, the user does not need to perform setting for application programs one by one, thereby greatly reducing complexity of an operation, saving the user's time and energy, and enhancing availability of the mobile terminal.

It should be noted that, when the program execution system provided in the foregoing embodiment executes a program, division of the foregoing function modules is only used as an example for illustration. In actual application, the foregoing functions can be allocated to different function modules and completed according to a requirement, that is, an inner structure of a terminal is divided into different function modules to complete all or some of the foregoing functions. In addition, the server, the mobile terminal, the program execution system, and the program execution method embodiment provided in the foregoing embodiments belong to a same idea. For a specific implementation process, refer to the method embodiments, and details are not described herein again. All or some of the steps in each of the foregoing method embodiments may refer to one another. Due to limited space of this specification, some steps or features already described in some method embodiments are not described again in another method embodiment, and reference may be made to the steps or the features already described in the method embodiments.

In addition, the mobile terminal in the present invention may include but is not limited to: a user terminal device, such as a PC, a tablet computer, a mobile phone, and a PDA, and the present invention is not limited thereto.

The foregoing sequence numbers of the embodiments of the present invention are for description only and do not represent an advantage or disadvantage of the embodiments.

All or some of the steps in the embodiments of the present invention may be implemented by software, and relevant software programs may be stored in a readable storage medium, for example, an optical disc or a hard disk.

It needs to be noted that "first, second . . ." described in the present invention is only used to distinguish objects and has no special meaning.

The foregoing descriptions are merely exemplary embodiments of the present invention, but are not intended to limit the present invention. Any modification, equivalent replacement, and improvement made without departing from the spirit and principle of the present invention shall fall in the protection scope of the present invention.

What is claimed is:

1. A program execution method, wherein the method comprises:
receiving a user action (UA) record sent by a mobile terminal;
searching the UA record for a UA sequence that repeatedly appears;
determining an association relationship between UAs in the UA sequence that repeatedly appears;
creating a corresponding use mode according to the association relationship; and
sending a use mode to the mobile terminal so that the mobile terminal uses the use mode corresponding to a monitored UA,
wherein the user action refers to an operation performed on an application program on the mobile terminal,
wherein determining the association relationship between the UAs in the UA sequence that repeatedly appears comprises:
grouping the N UA sequences to form a UA sequence set for any UA sequence that repeatedly appears N times within a preset time, wherein N≥2;
acquiring some UA sequences from the UA sequence set;
using all UAs in the some UA sequences to form a first UA sequence set;
generating, according to a first user environment (UE) of the UAs in the first UA sequence set, a mapping function of the UE of the UA sequence;
acquiring all UAs in a remaining UA sequence except the some UA sequences from the UA sequence set to form a second UA sequence set;
verifying the mapping function according to a second UE of the UAs in the second UA sequence set;
determining, according to a result of the verifying, whether the mapping function meets a specified requirement;
determining that the UAs in the UA sequence are in a causal association relationship when the mapping function meets the specified requirement; and
determining that the UAs in the UA sequence are in an aggregate association relationship when the mapping function does not meet the specified requirement,
wherein the mapping function of the UE is obtained after function fitting is performed by using an initial value of the UE as an independent variable and using a changed value of the UE as a function value,
wherein the initial value of the UE refers to a value of the UE before a UA occurs, and
wherein the changed value of the UE refers to the value of the UE after the UA occurs.

2. The method according to claim 1, wherein verifying the mapping function according to the second UE of the UAs in the second UA sequence set, and determining, according to the result of the verifying, whether the mapping function meets a specified requirement comprises:
acquiring the second UE of the UAs in the second UA sequence set;
using the initial value of the second UE as the independent variable;
calculating a function value of the second UE by using the mapping function;
calculating an average deviation rate of the mapping function according to the function value of the second UE and the changed value of the second UE;
determining whether the average deviation rate of the mapping function is less than a preset deviation rate threshold;
determining that the mapping function meets the specified requirement when the average deviation rate of the mapping function is less than a preset deviation rate threshold; and
determining that the mapping function does not meet the specified requirement when the average deviation rate of the mapping function is not less than the preset deviation rate threshold.

3. The method according to claim 1, wherein creating the corresponding use mode according to the association relationship comprises:
generating a causal use mode corresponding to the causal association relationship when the association relationship is the causal association relationship,
wherein the causal use mode comprises:
a first list of UAs that trigger the causal association relationship,
a second list of UAs causally associated with the UAs that trigger the causal association relationship, and
the mapping function of the UE of the UA in the causal association relationship; and
generating an aggregate use mode corresponding to the aggregate association relationship when the association relationship is the aggregate association relationship, and one of the following:
wherein the aggregate use mode comprises a third list of UAs that trigger the aggregate association relationship, and a fourth list of UAs aggregately associated with the UAs that trigger the aggregate association relationship, or
wherein the aggregate use mode comprises the third list of UAs that trigger the aggregate association relationship, the fourth list of UAs aggregately associated with the UAs that trigger the aggregate association relationship, and the UE of the UA in the aggregate association relationship.

4. The method according to claim 1, wherein the UE refers to an environment in which the mobile terminal is during occurrence, before occurrence or after occurrence of a UA, and wherein the UE comprises one or more of the following: time, location, temperature, light, volume of an external environment, volume of the mobile terminal, gravity, and screen brightness.

5. A program execution method, wherein the method comprises:
acquiring a user action (UA) record;
searching the UA record for a UA sequence that repeatedly appears;
determining an association relationship between UAs in the UA sequence;
creating a corresponding use mode according to the association relationship;
determining whether a UA meets a trigger condition of at least one use mode of the use modes when a mobile terminal monitors the UA; and
using the at least one use mode whose trigger condition is met on the mobile terminal when the UA meets a trigger condition of the at least one use mode of the use modes,
wherein the user action refers to an operation performed on an application program on the mobile terminal, wherein determining the association relationship between the UAs in the UA sequence that repeatedly appears comprises:
grouping the N UA sequences to form a VA sequence set for any UA sequence that repeatedly appears N times within a preset time, wherein N≥2;
acquiring some UA sequences from the VA sequence set;
using all UAs in the some UA sequences to form a first UA sequence set;
generating, according to a first user environment (UE) of the UAs in the first UA sequence set, a mapping function of the UE of the UA sequence;
acquiring all UAs in a remaining UA sequence except the some UA sequences from the UA sequence set to form a second UA sequence set;
verifying the mapping function according to a second UE of the UAs in the second UA sequence set;
determining, according to a result of the verifying, whether the mapping function meets a specified requirement;
determining that the UAs in the UA sequence are in a causal association relationship when the mapping function meets the specified requirement; and
determining that the UAs in the UA sequence are in an aggregate association relationship when the mapping function does not meet the specified requirement,
wherein the mapping function of the UE is obtained after function fitting is performed by using an initial value of the UE as an independent variable and using a changed value of the UE as a function value,
wherein the initial value of the UE refers to a value of the UE before a UA occurs, and
wherein the changed value of the UE refers to the value of the UE after the UA occurs.

6. The method according to claim 5, wherein verifying the mapping function according to the second UE of the UAs in the second UA sequence set, and determining, according to the result of the verifying, whether the mapping function meets a specified requirement comprises:
acquiring the second UE of the UAs in the second UA sequence set;
using the initial value of the second UE as the independent variable;
calculating a function value of the second UE by using the mapping function;
calculating an average deviation rate of the mapping function according to the function value of the second UE and the changed value of the second UE;
determining whether the average deviation rate of the mapping function is less than a preset deviation rate threshold;
determining that the mapping function meets the specified requirement when the average deviation rate of the mapping function is less than a preset deviation rate threshold; and
determining that the mapping function does not meet the specified requirement when the average deviation rate of the mapping function is not less than the preset deviation rate threshold.

7. The method according to claim 5, wherein creating the corresponding use mode according to the association relationship comprises:
generating a causal use mode corresponding to the causal association relationship when the association relationship is the causal association relationship, wherein the causal use mode comprises:
a first list of UAs that trigger the causal association relationship,
a second list of UAs causally associated with the UAs that trigger the causal association relationship, and
the mapping function of the UE of the UA in the causal association relationship; and
generating an aggregate use mode corresponding to the aggregate association relationship when the association relationship is the aggregate association relationship, and one of the following:
wherein the aggregate use mode comprises a third list of UAs that trigger the aggregate association relationship, and a fourth list of UAs aggregately associated with the UAs that trigger the aggregate association relationship, or
wherein the aggregate use mode comprises the third list of UAs that trigger the aggregate association relationship, the fourth list of UAs aggregately associated with the UAs that trigger the aggregate association relationship, and the UE of the UA in the aggregate association relationship.

8. The method according to claim 5, wherein the UE refers to an environment in which the mobile terminal is during occurrence, before occurrence or after occurrence of a UA, and wherein the UE comprises one or more of the following: time, location, temperature, light, volume of an external environment, volume of the mobile terminal, gravity, and screen brightness.

9. A server, wherein the server comprises:
a receiver configured to receive a user action (UA) record sent by a mobile terminal;
a processor coupled to the receiver and configured to:
search the UA record for a UA sequence that repeatedly appears;
determine an association relationship between UAs in the UA sequence that repeatedly appears; and
create a corresponding use mode according to the association relationship; and
a transmitter coupled to the processor and configured to send the use mode to the mobile terminal so that the mobile terminal uses a use mode corresponding to a monitored UA,
wherein the user action refers to an operation performed on an application program on the mobile terminal,
wherein the processor is further configured to:
group the N UA sequences to form the UA sequence set for any UA sequence that repeatedly appears N times within a preset time, wherein N? 2;
acquire some UA sequences from the UA sequence set;
use all UAs in the some UA sequences to form a first UA sequence set;
generate, according to a first user environment (UE) of the UAs in the first UA sequence set, a mapping function of the UE of the UA sequence;
acquire all UAs in a remaining UA sequence except the some UA sequences from the UA sequence set to form a second UA sequence set;
verify the mapping function according to a second UE of the UAs in the second UA sequence set;
determine, according to a result of the verifying, whether the mapping function meets a specified requirement;
determine that the UAs in the UA sequence are in a causal association relationship when the mapping function meets the specified requirement; and determine that the UAs in the UA sequence are in an aggregate association relationship when the mapping function does not meet the specified requirement, wherein the mapping function of the UE is obtained after function fitting is performed by using an initial value of the UE as an independent variable and using a changed value of the UE as a function value, wherein the initial value of the UE refers to a value of the UE before the UA occurs, and wherein the changed value of the UE refers to the value of the UE after the UA occurs.

10. The server according to claim 9, wherein the processor is further configured to:

acquire the second UE of the UAs in the second UA sequence set;

use an initial value of the second UE as the independent variable;

calculate the function value of the second UE by using the mapping function;

calculate an average deviation rate of the mapping function according to the function value of the second UE and a changed value of the second UE;

determine whether the average deviation rate of the mapping function is less than a preset deviation rate threshold;

determine that the mapping function meets the specified requirement when the average deviation rate of the mapping function is less than the preset deviation rate threshold; and determine that the mapping function does not meet the specified requirement when the average deviation rate of the mapping function is not less than the preset deviation rate threshold.

11. The server according to claim 9, wherein the processor is further configured to:

generate a causal use mode corresponding to the causal association relationship when the association relationship is the causal association relationship, wherein the causal use mode comprises a first list of UAs that trigger the causal association relationship, a second list of UAs causally associated with the UAs that trigger the causal association relationship, and the mapping function of the UE of the UA in the causal association relationship; and generate an aggregate use mode corresponding to the aggregate association relationship when the association relationship is the aggregate association relationship, and one of the following:

wherein the aggregate use mode comprises a third list of UAs that trigger the aggregate association relationship, and a fourth list of UAs aggregately associated with the UAs that trigger the aggregate association relationship, or wherein the aggregate use mode comprises the third list of UAs that trigger the aggregate association relationship, the fourth list of UAs aggregately associated with the UAs that trigger the aggregate association relationship, and the UE of the UA in the aggregate association relationship.

12. A mobile terminal, wherein the mobile terminal comprises:

a processor configured to:

acquire a user action (UA) record;

search the UA record for a UA sequence that repeatedly appears, and determine an association relationship between UAs in the UA sequence;

create a corresponding use mode according to the association relationship;

determine whether a UA meets a trigger condition of at least one use mode of the use modes when the UA is monitored;

use the at least one use mode whose trigger condition is met on the mobile terminal when determining that the UA meets a trigger condition of the at least one use mode of the use modes, wherein the user action refers to an operation performed on an application program on the mobile terminal, group the N UA sequences to form the UA sequence set for any UA sequence that repeatedly appears N times within a preset time, wherein N≥2;

acquire some UA sequences from the UA sequence set;

use all UAs in the some UA sequences to form a first UA sequence set;

generate, according to a first user environment (UE) of the UAs in the first UA sequence set, a mapping function of the UE of the UA sequence;

acquire all UAs in a remaining UA sequence except the some UA sequences from the UA sequence set to form a second UA sequence set;

verify the mapping function according to a second UE of the UAs in the second UA sequence set;

determine, according to a result of the verifying, whether the mapping function meets a specified requirement;

determine that the UAs in the UA sequence are in a causal association relationship when the mapping function meets the specified requirement; and determine that the UAs in the UA sequence are in an aggregate association relationship when the mapping function does not meet the specified requirement, wherein the mapping function of the UE is obtained after function fitting is performed by using an initial value of the UE as an independent variable and using a changed value of the UE as a function value, wherein the initial value of the UE refers to a value of the UE before the UA occurs, and wherein the changed value of the UE refers to the value of the UE after the UA occurs.

13. The mobile terminal according to claim 12, wherein the processor is further configured to:

acquire the second UE of the UAs in the second UA sequence set;

use an initial value of the second UE as the independent variable;

calculate the function value of the second UE by using the mapping function;

calculate an average deviation rate of the mapping function according to the function value of the second UE and a changed value of the second UE;

determine whether the average deviation rate of the mapping function is less than a preset deviation rate threshold;

determine that the mapping function meets the specified requirement when the average deviation rate of the mapping function is less than the preset deviation rate threshold; and determine that the mapping function does not meet the specified requirement when the average deviation rate of the mapping function is not less than the preset deviation rate threshold.

14. The mobile terminal according to claim 12, wherein the processor is further configured to:
  generate a causal use mode corresponding to the causal association relationship when the association relationship is the causal association relationship, wherein the causal use mode comprises a first list of UAs that trigger the causal association relationship, a second list of UAs causally associated with the UAs that trigger the causal association relationship, and the mapping function of the UE of the UA in the causal association relationship; and
  generate an aggregate use mode corresponding to the aggregate association relationship when the association relationship is the aggregate association relationship, and one of the following:
    wherein the aggregate use mode comprises a third list of UAs that trigger the aggregate association relationship, and a fourth list of UAs aggregately associated with the UAs that trigger the aggregate association relationship, or
    wherein the aggregate use mode comprises the third list of UAs that trigger the aggregate association relationship, the fourth list of UAs aggregately associated with the UAs that trigger the aggregate association relationship, and the UE of the UA in the aggregate association relationship.

15. The mobile terminal according to claim 12, wherein the processor is further configured to:
  acquire a second list of UAs causally associated with the UA and comprised in the causal use mode, and a mapping function of a UE of the VA in the association relationship when the at least one use mode whose trigger condition is met is a causal use mode;
  acquire a current UE of the mobile terminal;
  calculate a function value of the current UE by using the mapping function;
  execute at least some of the UAs in the second list of UAs on the mobile terminal; and
  set the UE of the mobile terminal according to the function value of the current UE, and
  wherein the processor is further configured to perform one of the following:
    acquire a fourth list of UAs aggregately associated with the UA and comprised in the aggregate use mode, and execute at least some of the UAs in the fourth list of UAs on the mobile terminal; or
    acquire the fourth list of UAs aggregately associated with the UA and comprised in the aggregate use mode, and the UE of the UA in the association relationship, execute at least some of the UAs in the fourth list of UAs on the mobile terminal, and set the UE of the mobile terminal according to the UE that is acquired.

* * * * *